US008832005B2

(12) United States Patent
Takagi et al.

(10) Patent No.: US 8,832,005 B2
(45) Date of Patent: Sep. 9, 2014

(54) INFORMATION PROCESSING APPARATUS, AND METHOD, INFORMATION PROCESSING SYSTEM, AND PROGRAM

(75) Inventors: Tsuyoshi Takagi, Saitama (JP); Takayuki Sakamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 387 days.

(21) Appl. No.: 13/291,676

(22) Filed: Nov. 8, 2011

(65) Prior Publication Data

US 2012/0123977 A1 May 17, 2012

(30) Foreign Application Priority Data

Nov. 15, 2010 (JP) ................................ P2010-254828

(51) Int. Cl.
| | | |
|---|---|---|
| *G06F 15/18* | (2006.01) | |
| *G06N 5/04* | (2006.01) | |
| *G06F 17/30* | (2006.01) | |
| *G06Q 30/02* | (2012.01) | |
| *G06Q 10/00* | (2012.01) | |

(52) U.S. Cl.
CPC .... *G06F 17/30761* (2013.01); *G06F 17/30053* (2013.01); *G06Q 30/02* (2013.01); *G06Q 10/00* (2013.01)
USPC .......................................................... 706/12

(58) Field of Classification Search
CPC .................... G06F 17/30035; G06F 17/30053; G06F 17/30761; G06Q 10/00; G06Q 30/02
USPC ........................................................... 706/12
See application file for complete search history.

(56) References Cited

U.S. PATENT DOCUMENTS

| | | | |
|---|---|---|---|
| 6,438,579 B1 * | 8/2002 | Hosken .......................... | 709/203 |
| 2003/0089218 A1 | 5/2003 | Gang | |
| 2003/0225777 A1 * | 12/2003 | Marsh ............................ | 707/101 |
| 2005/0165782 A1 * | 7/2005 | Yamamoto ........................ | 707/7 |
| 2006/0047678 A1 * | 3/2006 | Miyazaki et al. .............. | 707/102 |

(Continued)

FOREIGN PATENT DOCUMENTS

| | | |
|---|---|---|
| JP | 2007-202181 | 8/2007 |
| WO | WO 2008/022328 | 2/2008 |

OTHER PUBLICATIONS

Chen T. et al., "Content Recommendation System Based on Private Dynamic User Profile", Proceedings of the Sixth International Conference on Machine Learning and Cybernetics, Hong Kong, Aug. 19-22, 2007, pp. 2112-2118.*
Hijikata Y. et al., "Content-based Music Filtering System with Editable User Profile", SAC'06 Apr. 23-27, 2006, Dijon, France, pp. 1050-1057.*

(Continued)

*Primary Examiner* — Jeffrey A Gaffin
*Assistant Examiner* — Dave Misir
(74) *Attorney, Agent, or Firm* — Sherr & Jiang, PLLC

(57) ABSTRACT

Disclosed is an information processing apparatus including: a learning unit that learns user preference for each type in each category for classifying content items in a server; a selection unit that, based on type information indicating a recommendable type which is a type of content items recommendable by the server and a substitutable type which is a type that satisfies a predetermined condition out of the recommendable type, selects one or more recommendable types in a case where there is the recommendable type corresponding with user preference in the selected category, and selects one or more substitutable types in the selected category in a case where there is no recommendable type corresponding with user preference; and an obtaining unit that obtains a content of the selected type from the server.

16 Claims, 21 Drawing Sheets

(56) References Cited

U.S. PATENT DOCUMENTS

| | | | |
|---|---|---|---|
| 2006/0294093 A1* | 12/2006 | Yamamoto et al. | 707/5 |
| 2008/0134043 A1* | 6/2008 | Georgis et al. | 715/733 |
| 2008/0257134 A1 | 10/2008 | Oppenheimer | |
| 2009/0006288 A1* | 1/2009 | Yamamoto | 706/12 |
| 2011/0040790 A1* | 2/2011 | Tateno | 707/780 |
| 2011/0112994 A1 | 5/2011 | Goto | |
| 2012/0284302 A1* | 11/2012 | Takagi et al. | 707/769 |

OTHER PUBLICATIONS

Chen H. et al., "A Music Recommendation System Based on Music and User Grouping", Journal of Intelligent Information Systems, 24:2/3, pp. 113-132, 2005.*

Man-Kwan, S. et al., "Relevance feedback for category search in music retrieval based on semantic concept learning", Multimedia Tools and Appl, Mar. 5, 2008, vol. 39, No. 2, pp. 243-262.

European Search Report in Application No. 11188060.5 dated Jul. 31, 2012, 8 pages.

* cited by examiner

FIG. 2

| HIERARCHY | CATEGORY | TYPE 1 | TYPE 2 | ... |
|---|---|---|---|---|
| LARGE CLASSIFICATION | TIME OF RELEASE (YEARS) | 1960 | 1970 | ... |
| | GENRE (LARGE CLASSIFICATION) | POP | ROCK | ... |
| | ... | ... | ... | ... |
| MIDDLE CLASSIFICATION | TIME OF RELEASE (YEARS) | 1960 | 1961 | ... |
| | GENRE (MIDDLE CLASSIFICATION) | ASIAN-POP | EUROPEAN-POP | ... |
| | ... | ... | ... | ... |
| SMALL CLASSIFICATION | TIME OF RELEASE (SEASON) | SPRING | SUMMER | ... |
| | GENRE (SMALL CLASSIFICATION) | JAPANESE-POP | CHINESE-POP | ... |
| | ... | ... | ... | ... |

FIG. 5

| CONTENTS ID | LARGE CLASSIFICATION | | | MIDDLE CLASSIFICATION | | | SMALL CLASSIFICATION |
|---|---|---|---|---|---|---|---|
| | TIME OF RELEASE (YEARS) | GENRE (LARGE CLASSIFICATION) | ... | TIME OF RELEASE (YEARS) | GENRE (MIDDLE CLASSIFICATION) | ... | ... |
| CONTENT A | 1960 | POP | ... | 1963 | ASIAN-POP | ... | ... |
| CONTENT B | 1980 | ROCK | ... | 1985 | EUROPEAN-POP | ... | ... |
| ... | ... | ... | ... | ... | ... | ... | ... |

FIG. 10

| CATEGORY | TYPE | NUMBER OF RECOMMENDABLE CONTENTS | RECOMMENDABLE TYPE | SUBSTITUTABLE TYPE |
|---|---|---|---|---|
| RELEASE TIME (LARGE CLASSIFICATION) | 1960 | 0 | × | × |
| | 1970 | 100 | × | × |
| | ⋯ | ⋯ | ⋯ | ⋯ |
| | 1980 | 100000 | ○ | ○ |
| ⋯ | ⋯ | ⋯ | ⋯ | ⋯ |
| GENRE (LARGE CLASSIFICATION) | POP | 100000 | ○ | ○ |
| | ROCK | 100000 | ○ | ○ |
| | ⋯ | ⋯ | ⋯ | ⋯ |
| | JAZZ | 100 | × | × |

FIG. 17

| CATEGORY | TYPE | NUMBER OF RECOMMENDABLE CONTENTS | RECOMMENDABLE TYPE | SUBSTITUTABLE TYPE |
|---|---|---|---|---|
| GENRE (MIDDLE CLASSIFICATION) | ASIAN-POP | 100 | × | × |
| | EUROPEAN-POP | 500 | ○ | × |
| | INDIAN-POP | 100000 | ○ | ○ |
| | ‥ | ‥ | ‥ | ‥ |
| | AMERICAN-POP | 100000 | ○ | ○ |

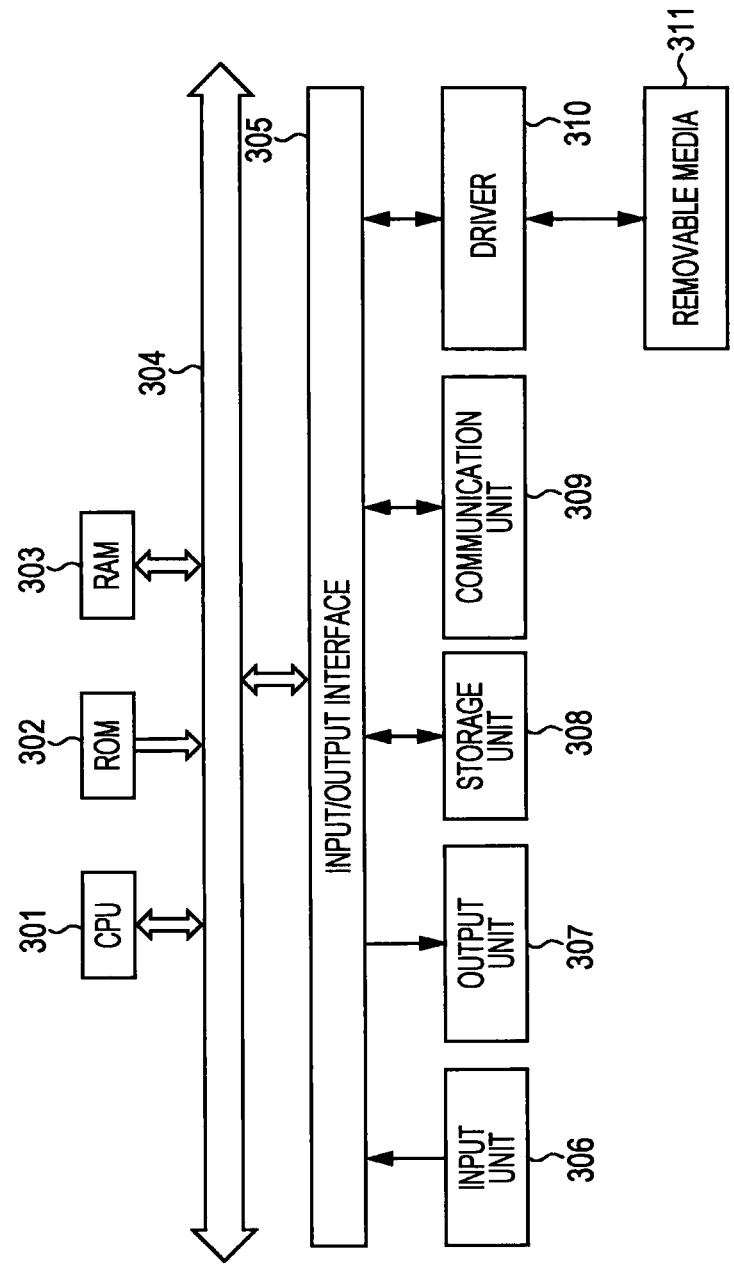

INFORMATION PROCESSING APPARATUS, AND METHOD, INFORMATION PROCESSING SYSTEM, AND PROGRAM

The present disclosure contains subject matter related to that disclosed in Japanese Priority Patent Application JP 2010-254828 filed in the Japan Patent Office on Nov. 15, 2010, the entire contents of which are hereby incorporated by reference.

BACKGROUND

The present disclosure relates to an information processing apparatus and method, an information processing system, and a program. Particularly, the disclosure relates to an information processing apparatus and method, an information processing system, and a program preferably used to recommend content.

In the related art, there have been proposed various methods for recommending content corresponding to user preference based on the attribute of the content that has been used by a user or evaluated as favorites in the past (for example, refer to Japanese Unexamined Patent Application Publication No. 2007-202181).

For example, there has been proposed a system for transmitting a query having as an extraction condition an attribute of the content evaluated as favorites by a user in the past from the client to the server so that the server extracts the content based on that extraction condition and delivers the content to the client.

SUMMARY

However, in some cases, it may be difficult to recommend the content for a user without assuming that the content satisfying an extraction condition designated by the client is necessarily present in the server. In this case, since unnecessary communication occurs between the client and the server, or unnecessary processing occurs in the server, the number of clients that can be processed is reduced. In addition, even though a user waits for a response from the server, it is difficult to recommend the content for a user. Therefore, a user may experience an unpleasant feeling.

It is desirable to provide a method of recommending the content by reflecting user preference while occurrence of unnecessary communication or processing is prevented.

According to a first embodiment of the disclosure, there is provided an information processing apparatus including: a learning unit that learns user preference for each type in each category for classifying content items in a server; a selection unit that, based on type information indicating a recommendable type which is a type of content items recommendable by the server and a substitutable type which is a type that satisfies a predetermined condition out of the recommendable type, selects one or more recommendable types in a case where there is the recommendable type corresponding with user preference in the selected category, and selects one or more substitutable types in the selected category in a case where there is no recommendable type corresponding with user preference; and an obtaining unit that obtains a content of the selected type from the server.

In a case where the selection unit selects a category that does not learn user preference, the selection unit may select one or more substitutable types when there is the substitutable type in the selected category, and the selection unit may select other categories when there is no substitutable type in the selected category.

The selection unit may select a type having high user preference as a priority out of the recommendable types in a case where there is the recommendable type corresponding with user preference in the selected category.

The selection unit may select a type approximate to the type corresponding with user preference out of the substitutable type in the selected category in a case where the recommendable type corresponding with user preference is not present in the selected category.

The obtaining unit may obtain the type information from the server or another server different from the server.

The obtaining unit may obtain a list of the content items of the selected type from the server or another server different from the server, and obtain a content from the server based on the list.

The recommendable type may be a type of content items in the server, the number of content items of the recommendable type being equal to or greater than a first threshold value, and the substitutable type may be a type of content items in the server, the number of content items of the substitutable type being equal to or greater than a second threshold value which is higher than the first threshold value.

According to a first embodiment of the disclosure, there is provided an information processing method of an image processing apparatus, the method including: learning user preference for each type in each category for classifying content items in a server; based on type information indicating a recommendable type which is a type of content items recommendable by the server and a substitutable type satisfying a predetermined condition out of the recommendable type, selecting one or more recommendable types in a case where there is the recommendable type corresponding with user preference in the selected category, and selecting one or more substitutable types in the selected category in a case where there is no recommendable type corresponding with user preference; and obtaining a content of the selected type from the server.

According to an embodiment of the disclosure, there is provided a program for executing an information processing method on a computer, the method including: learning user preference for each type in each category for classifying content items in a server; based on type information indicating a recommendable type which is a type of content items recommendable by the server and a substitutable type satisfying a predetermined condition out of the recommendable type, selecting one or more recommendable types in a case where there is the recommendable type corresponding with user preference in the selected category, and selecting one or more substitutable types in the selected category in a case where there is no recommendable type corresponding with user preference; and obtaining a content of the selected type from the server.

According to a second embodiment of the disclosure, there is provided an information processing system including a client, a first server, and a second server, wherein the client has a learning unit that learn user preference for each type in each category for classifying content items in a server, a selection unit that, based on type information indicating a recommendable type which is a type of content items recommendable by the server and a substitutable type satisfying a predetermined condition out of the recommendable type, selects one or more recommendable types in a case where there is the recommendable type corresponding with user preference in the selected category, and selects one or more substitutable types in the selected category in a case where there is no recommendable type corresponding with user preference, and an obtaining unit that obtains a content of the selected type from the server, wherein the first server includes a first transmission unit for transmitting the content of the type selected by the client to the client, and wherein the second server includes an information creating unit for creating the type information, and a second transmission unit for transmitting the type information to the client.

The second server may further include a list creating unit for creating a list of content items of the type selected by the client, the second transmission unit of the second server further may transmit the list to the client, and the obtaining unit of the client may further obtain the list from the second server, and obtains content items from the first sever based on the list.

According to a second embodiment of the disclosure, there is provided an information processing method including: in a client, learning user preference for each type in each category for classifying the content on a first server; in a second server, creating type information indicating a recommendable type which is a type of content items recommendable by the first server and a substitutable type satisfying a predetermined condition out of the recommendable type; and transmitting the type information to the client; in the client, based on the type information, selecting one or more recommendable types in a case where there is the recommendable type corresponding with user preference in the selected category, and selecting one or more substitutable types in the selected category in a case where there is no recommendable type corresponding with user preference; and obtaining the content of the selected type from the first server.

According to a third embodiment of the disclosure, there is provided an information processing apparatus including: a learning unit that learns user preference for each type in each category for classifying content items in a server; a selection unit that, based on type information indicating a recommendable type which is a type of content items recommendable by the server, selecting one or more recommendable types in a case where there is the recommendable type corresponding with user preference in the selected category, and selecting one or more types out of a type corresponding with user preference or a type approximate to the type corresponding with user preference satisfying a predetermined first condition in the selected category in a case where there is no recommendable type corresponding with user preference; and an obtaining unit that obtains a content of the selected type from the server.

The selection unit may select one or more types satisfying the first condition out of the recommendable types approximate to the type corresponding with user preference in the selected category in a case where there is no recommendable type corresponding with user preference in the selected category.

The selection unit may select one or more types satisfying the first condition only out of types corresponding with user preference in the selected category in a case where there is no recommendable type corresponding with user preference in the selected category.

The type information may further indicate the number of content items for each type, and the first condition may be to determine whether or not a total number of content items of the selected type is equal to or greater than a predetermined threshold value.

The type information may further indicate a substitutable type satisfying a predetermined second condition out of the recommendable types, and the selection unit may select one or more substitutable types in the selected category in a case where there is no type corresponding with user preference in the selected category.

The recommendable type may be a type of content items having a number equal to or greater than a first threshold value out of the content items in the server, and the substitutable type may be a type of content items having a number equal to or greater than a second threshold value which is higher than the first threshold value out of the content items in the server.

According to a third embodiment of the disclosure, there is provided an information processing method of an information processing apparatus, the method including: learning user preference for each type in each category for classifying content items in a server; based on type information indicating a recommendable type which is a type of content items recommendable by the server, selecting one or more recommendable types in a case where there is the recommendable type corresponding with user preference in the selected category, and selecting one or more types out of a type corresponding with user preference or a type approximate to the type corresponding with user preference satisfying a predetermined first condition in the selected category in a case where there is no recommendable type corresponding with user preference; and obtaining a content of the selected type from the server.

According to a third embodiment of the disclosure, there is provided a program for executing an information processing method in a computer, the method including: learning user preference for each type in each category for classifying content items in a server; based on type information indicating a recommendable type which is a type of content items recommendable by the server, selecting one or more recommendable types in a case where there is the recommendable type corresponding with user preference in the selected category, and selecting one or more types out of a type corresponding with user preference or a type approximate to the type corresponding with user preference satisfying a predetermined first condition in the selected category in a case where there is no recommendable type corresponding with user preference; and obtaining a content of the selected type from the server.

According to the first embodiment of the disclosure, the method includes learning user preference for each type in each category for classifying content items in a server; based on type information indicating a recommendable type which is a type of content items recommendable by the server and a substitutable type satisfying a predetermined condition out of the recommendable type, selecting one or more recommendable types in a case where there is the recommendable type corresponding with user preference in the selected category, and selecting one or more substitutable types in the selected category in a case where there is no recommendable type corresponding with user preference; and obtaining a content of the selected type from the server.

According to the second embodiment of the disclosure, the method includes: in a client, learning user preference for each type in each category for classifying the content on a first server; in a second server, creating type information indicating a recommendable type which is a type of content items recommendable by the first server and a substitutable type satisfying a predetermined condition out of the recommendable type, and transmitting the type information to the client; and, in the client, based on the type information, selecting one or more recommendable types in a case where there is the recommendable type corresponding with user preference in the selected category, and selecting one or more substitutable types in the selected category in a case where there is no recommendable type corresponding with user preference, and obtaining the content of the selected type from the first server.

According to the third embodiment of the disclosure, the method includes: learning user preference for each type in each category for classifying content items in a server; based on type information indicating a recommendable type which is a type of content items recommendable by the server, selecting one or more recommendable types in a case where there is the recommendable type corresponding with user preference in the selected category, and selecting one or more types out of a type corresponding with user preference or a type approximate to the type corresponding with user preference satisfying a predetermined first condition in the selected category in a case where there is no recommendable type corresponding with user preference; and obtaining a content of the selected type from the server.

According to the first to third embodiments of the disclosure, it is possible to recommend the content by reflecting user preference. Particularly, according to the first to third embodiments of the disclosure, it is possible to recommend content items by reflecting user preference while unnecessary communication and unnecessary processing are prevented.

BRIEF DESCRIPTION OF THE DRAWINGS

FIG. 2 is a diagram illustrating an exemplary content attribute table.

FIG. 5 is a diagram illustrating an exemplary content attribute information list.

FIG. 10 is a diagram illustrating exemplary catalog information.

FIG. 17 is a diagram illustrating another example of the catalog information.

FIG. 23 is a block diagram illustrating an exemplary computer configuration.

DETAILED DESCRIPTION OF EMBODIMENTS

Hereinafter, embodiments of the disclosure will be described. Description will be made in the following sequence.
1. Embodiments of Disclosure
2. Modifications 1. Embodiments of Disclosure Configuration Example of Information Processing System 1

Figure 1:
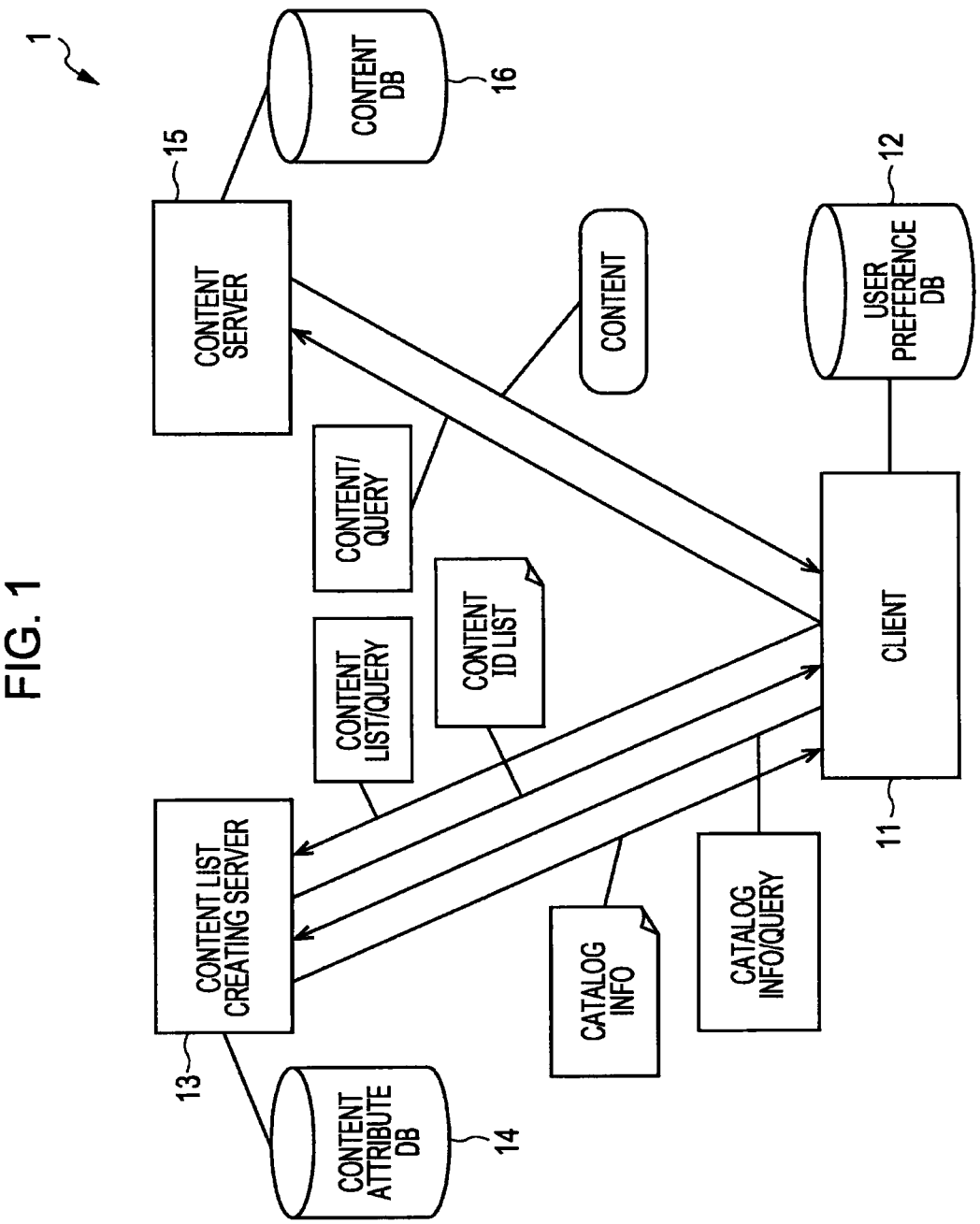
FIG. 1 is a block diagram illustrating an information processing system according to an embodiment of the disclosure.

FIG. 1 is a block diagram illustrating a configuration example of the information processing system according to an embodiment of the disclosure.

The information processing system 1 is a system that performs recommendation of content by reflecting preference of the users who use the client 11. Hereinafter, a case where music data is used as the content will be described.

The information processing system 1 includes a client 11, a user preference DB 12, a content list creating server 13, a content attribute DB (database) 14, a content server 15, and a content DB (database) 16. The client 11, the content list creating server 13, and a content server 15 are connected via a network (not shown) such as the Internet and communicate with each other via the network. The user preference DB 12 is connected to the client 11, the content attribute DB 14 is connected to the content list creating server 13, and the content DB 16 is connected to the content server 15.

The number of clients 11 shown in FIG. 1 is exemplary, and may be set to an arbitrary number.

The client 11 includes an apparatus capable of reproducing content items, such as a personal computer, a music player, a mobile phone, and a personal digital assistant (PDA).

The user preference DB 12 includes a user preference list indicating preferences for the content by a user who uses the client 11. Details of the user preference list will be described with reference to FIG. 7.

The content list creating server 13 creates catalog information indicating categories for classifying the content items stored in the content DB 16, classification of each type in each category, and attributes of each type and provides the catalog information to the client 11. In addition, the content list creating server 13 creates a content ID list that lists content IDs of the recommended content items and provides the content ID list to the client 11.

The content attribute DB 14 includes categories for classifying the content items stored in the content DB 16, a content attribute table indicating classification of types, and a content attribute information list indicating categories and types of each content. Details of the content attribute table will be described below with reference to FIGS. 2 to 4, and details of the content attribute information list will be described below with reference to FIG. 5.

The content server 15 provides the client 11 with content items.

In the content DB 16, the content items containing music data, the content IDs for identifying the content items, and the content items are registered in an interrelated manner.

Here, the data flow in the information processing system 1 will be described simply.

The client 11 transmits to the content list creating server 13 a catalog information/query for requesting transmission of the catalog information. In response to the catalog information/query, the content list creating server 13 creates the catalog information based on the content attribute information list in the content attribute DB 14 and transmits the catalog information to the client 11.

The client 11 selects a category and a type of the requested content based on the catalog information and the user preference list in the user preference DB 12. The client 11 transmits the content list/query to the content list creating server 13 by setting an extraction condition as the selected category and type. The content list creating server 13 extracts the content satisfying the extraction condition indicated in the content list/query from the content attribute information list in the content attribute DB 14. The content list creating server 13 creates the content ID list that lists the content ID and the like of the extracted content and transmits the content ID list to the client 11.

The client 11 transmits the content/query for requesting transmission of the content to the content server 15 based on the content ID list. The content server 15 extracts the content corresponding with the content ID indicated in the content query from the content DB 16 and transmits the extracted content to the client 11.

Content Attribute Table

FIG. 2 illustrates an exemplary content attribute table in the content attribute DB 14. In this example, the categories for classifying the content items are divided into time of release and genres. In addition, each category is divided into three layers including a large classification, a middle classification, and a small classification. Furthermore, a plurality of types are defined for each layer of each category. In other words, each layer of each category is classified into a plurality of types. The type of each layer of each category is assigned to each content as the attribute.

Figure 3:
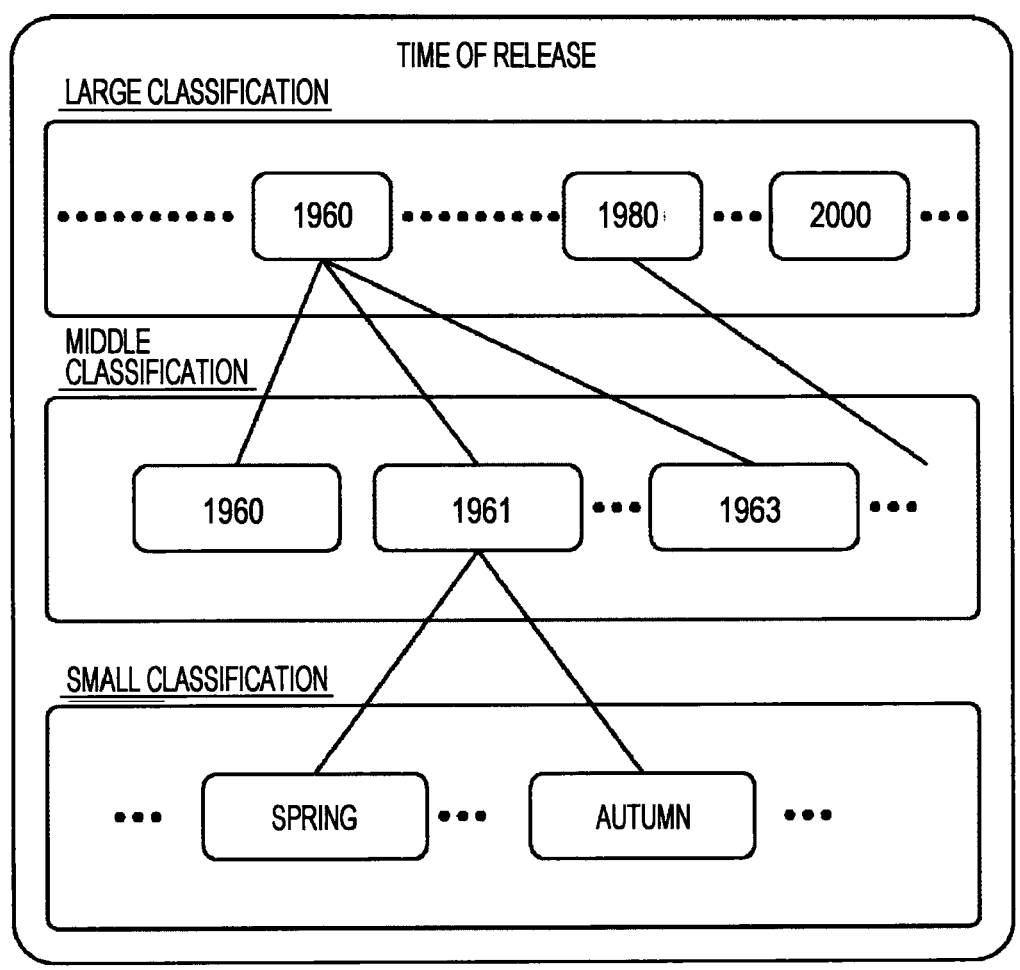
FIG. 3 is a diagram illustrating a tree structure regarding types of time of release.

FIG. 3 illustrates a tree structure regarding types of the time of release. The large classification of the time of release is divided into types in the unit of decade such as 1960's or 1970's. The middle classification of the time of release is divided into types in the unit of year such as 1960 or 1961. The small classification of the time of release is divided into types in the unit of season such as spring and autumn. The type of the small classification of the time of release is used by combining the upper layer type, that is, YEAR of the middle classification, such as spring of 1960 or autumn of 1961.

Figure 4:
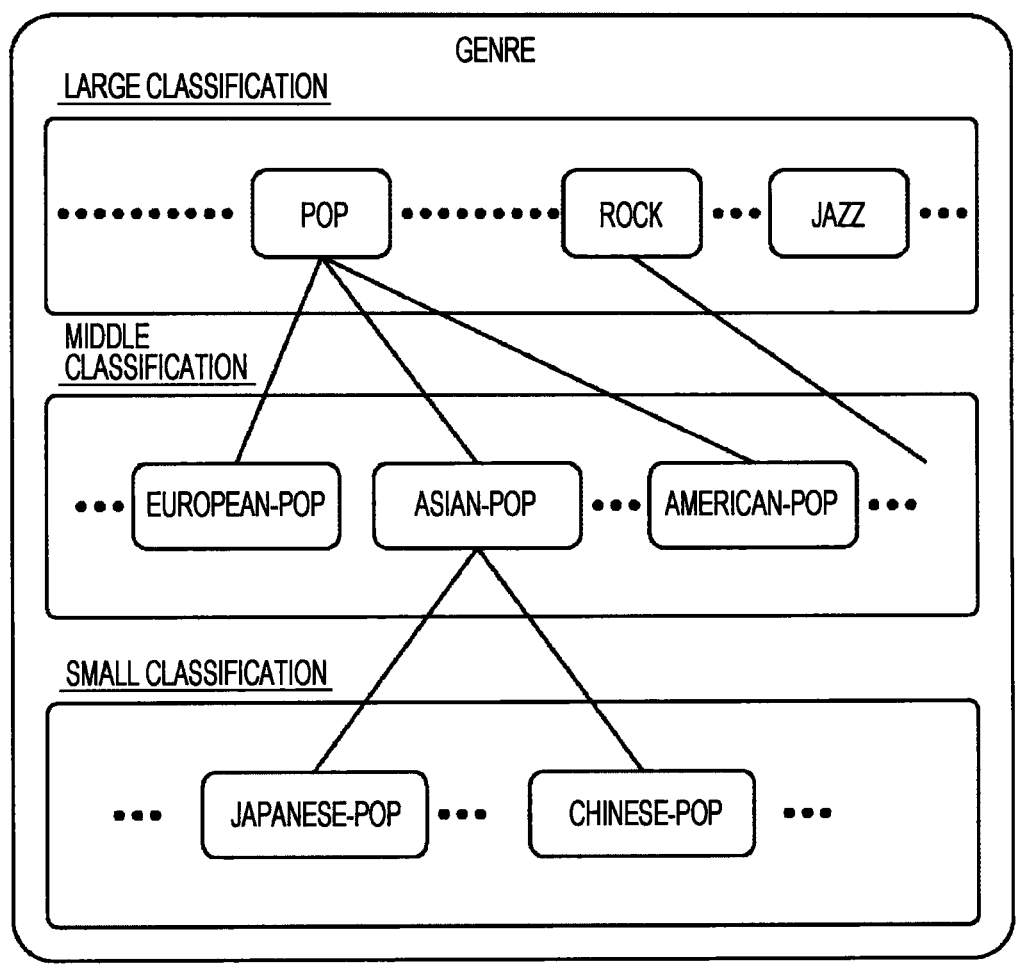
FIG. 4 is a diagram illustrating a tree structure regarding types of genres.

FIG. 4 illustrates a tree structure regarding types of the genre. The large classification of the genre is divided into types in the unit of genre of music such as pop or rock. In addition, the middle classification of the genre is divided into types in the unit of regional music genre in the world such as EUROPEAN-POP and ASIAN-POP. Furthermore, the small classification of the genre is divided into types in the unit of regional music genre more detailed than the middle classification, such as JAPANESE-POP or CHINESE-POP.

In each category, the type of the small classification necessarily belongs to one of the types in the middle classification. The type of the middle classification necessarily belongs to one of types of the large classification.

Content Attribute Information List

FIG. 5 illustrates a part of an exemplary content attribute information list in the content attribute DB 14. The content attribute information list contains content IDs of each content and types of each content in each category so that types of each content are represented for each category. For example, in this example, for the content having a content ID of content A, the type of the larger classification of the time of release is 1960's, and the type of the middle classification is 1963, the type of the large classification of the genre is pop, and the type of the small classification is ASIAN-POP.

User Preference List

Figure 6:
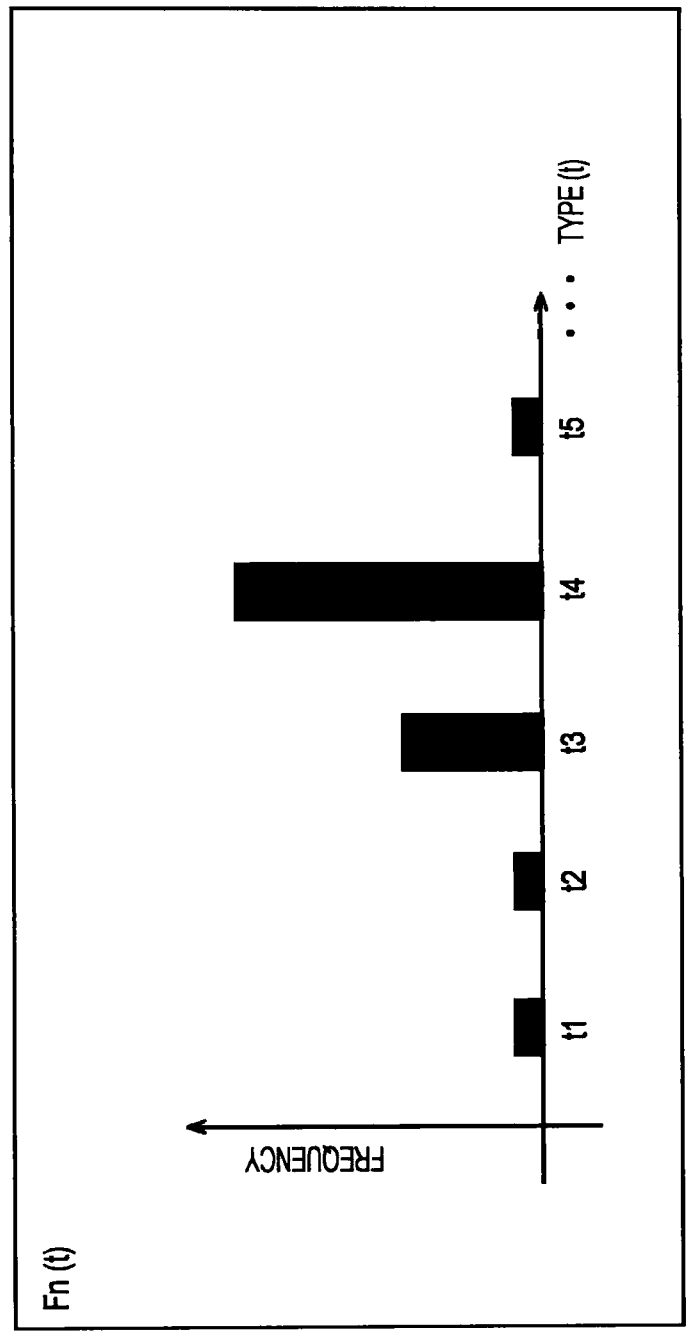
FIG. 6 is a diagram illustrating a user preference list.

FIG. 6 illustrates an exemplary bar chart registered in the user preference list in the user preference DB 12. FIG. 6 illustrates a bar chart obtained by counting the number of content items evaluated as favorite by a user of the client 11 for each type of each category in the content attribute table of FIG. 2. The abscissa denotes the type t, and the ordinate denotes frequency $Fn(t)$. For example, if the content of the type t1 is evaluated as "favorite" by a user, the frequency becomes $Fn(t1)+1$. If the content of the type t1 is evaluated as "unfavorite," the frequency becomes $Fn(t1)-1$. Data indicating this bar chart is registered in the user preference list.

Hereinafter, the frequency of each type in the user preference list will be referred to as preference frequency.

Configuration Example of Client 11

Figure 7:
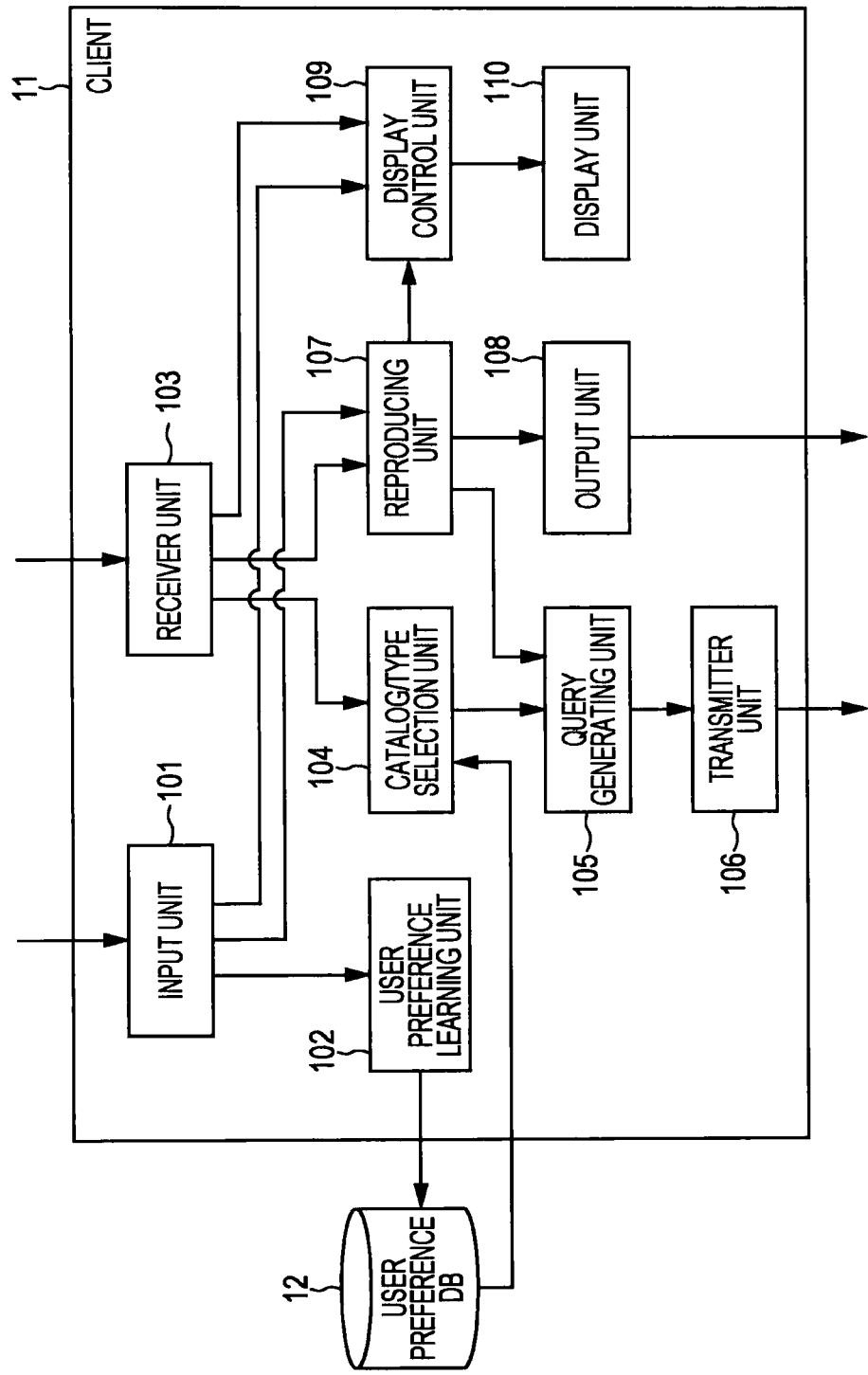
FIG. 7 is a block diagram illustrating a functional configuration example of a client.

FIG. 7 is a block diagram illustrating a configuration example of the function of the client 11. The client 11 includes an input unit 101, a user preference learning unit 102, a receiver unit 103, a category/type selection unit 104, a query generating unit 105, a transmitter unit 106, a reproduction unit 107, an output unit 108, a display control unit 109, and a display unit 110.

The input unit 101 includes an input device such as a switch, a key, a button, a mouse, and a touch panel, and is used to input an instruction and the like from a user to the client 11. The instruction and the like input through the input unit 101 are supplied to the user preference learning unit 102, the category/type selection unit 104, the reproduction unit 107, and the display control unit 109 as necessary.

The user preference learning unit 102 creates and updates the user preference list in the user preference DB 12 based on evaluation for the content input by a user through the input unit 101.

The receiver unit 103 communicates with the content list creating server 13 and the content server 15 using a predetermined scheme. The receiver unit 103 receives the catalog information from the content list creating server 13 and supplies the catalog information to the category/type selection unit 104. In addition, the receiver unit 103 receives the content ID list from the content list creating server 13 and supplies the content ID list to the reproduction unit 107. Furthermore, the receiver unit 103 receives the content from the content server 15 and supplies the received content and meta information included in the received content to the reproduction unit 107 and the display control unit 109, respectively.

The category/type selection unit 104 selects the category and the type of the requested content based on the user preference list in the catalog information and the user preference DB 12. The category/type selection unit 104 notifies the query generating unit 105 of the selected category and type.

The query generating unit 105 generates the catalog information/query, the content list/query, and the content/query and supplies them to the transmitter unit 106.

The transmitter unit 106 communicates with the content list creating server 13 and the content server 15 using a predetermined scheme. The transmitter unit 106 transmits the catalog information/query and the content list/query to the content list creating server 13. In addition, the transmitter unit 106 transmits the content/query to the content server 15.

The reproduction unit 107 reproduces the music data, and supplies the sound data obtained as a result to the output unit 108. In addition, the reproduction unit 107 appropriately notifies the display control unit 109 of a reproduction status of the music data. Furthermore, the reproduction unit 107 notifies the query generating unit 105 of the content ID of the requested content.

The output unit 108 includes, for example, a loudspeaker, a sound output terminal, and the like. The output unit 108 outputs sound based on the sound data or outputs sound data to other devices connected to the output unit 108 (for example, headphones, a loudspeaker, or other music players).

The display control unit 109 performs control such that the display unit 110 displays various screens such as a manipulation screen or music data on the display unit 110.

The display unit 110 includes, for example, an organic EL display, a liquid crystal display (LCD), and the like.

Exemplary Configuration of Content List Creating Server 13

Figure 8:
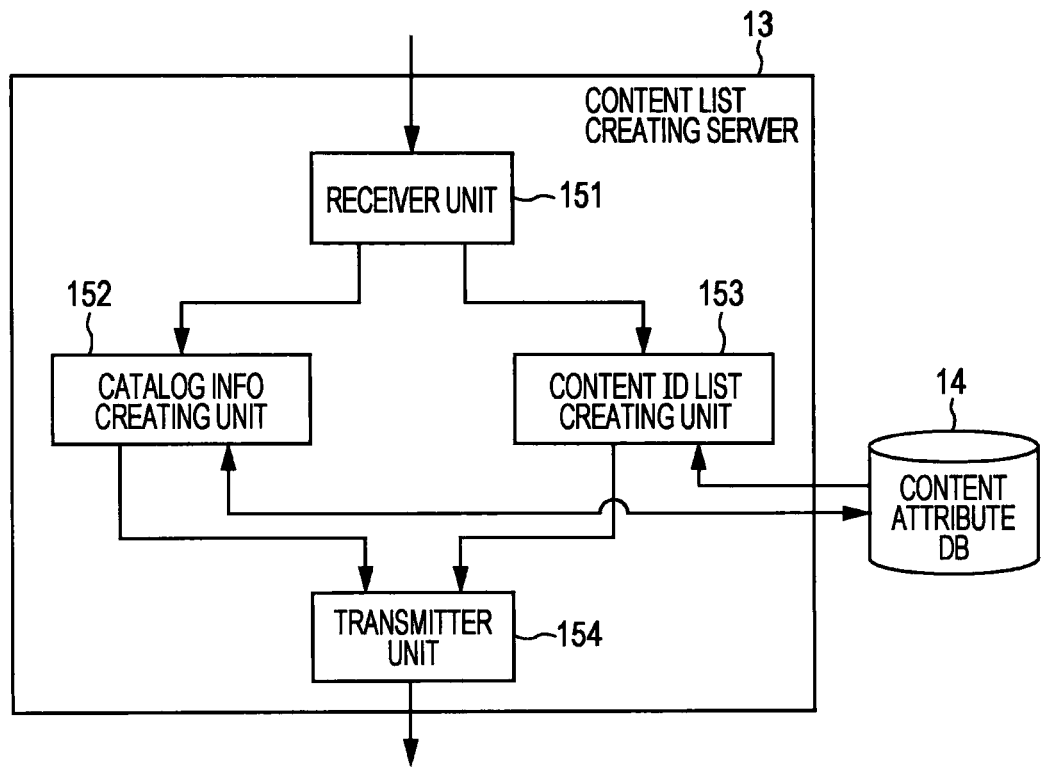
FIG. 8 is a block diagram illustrating a functional configuration example of a content list creating server.

FIG. 8 is a block diagram illustrating an exemplary functional configuration of the content list creating server 13. The content list creating server 13 includes a receiver unit 151, a catalog information creating unit 152, a content ID list creating unit 153, and a transmitter unit 154.

The receiver unit 151 communicates with the client 11 using a predetermined scheme. The receiver unit 103 receives the catalog information/query from the client 11 and supplies the catalog information/query to the catalog information creating unit 152. In addition, the receiver unit 103 receives the content list/query from the client 11 and supplies the content list query to the content ID list creating unit 153.

The catalog information creating unit 152 creates the catalog information based on the content attribute information list in the content attribute DB 14 and supplies the catalog information to the transmitter unit 154.

The content ID list creating unit 153 extracts information on the content corresponding with the extraction condition indicated in the content list query from the content attribute information list in the content attribute DB 14. In addition, the content ID list creating unit 153 creates the content ID list containing information on the extracted content. Therefore, the content ID list contains the categories and the types of the content items in association with the content IDs of each extracted content. In addition, the content ID list creating unit 153 supplies the created content ID list to the transmitter unit 154.

The transmitter unit 154 communicates with the client 11 using a predetermined scheme. The transmitter unit 154 transmits the catalog information and the content ID list to the client 11.

Process in Information Processing System 1

Next, the process executed by the information processing system 1 will be described with reference to FIGS. 9 to 22.

Process of Creating Catalog Information

Figure 9:
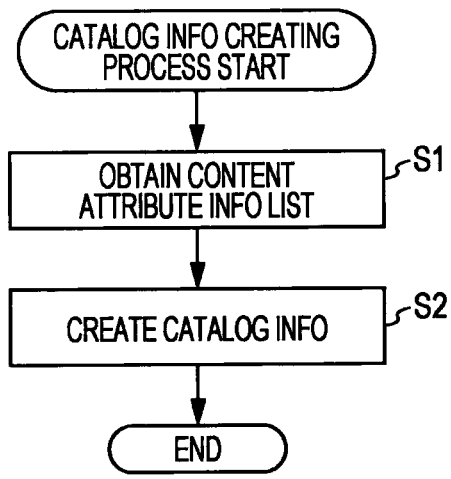
FIG. 9 is a flowchart illustrating a process of creating catalog information.

First, a process of creating catalog information executed by the content list creating server 13 will be described with reference to the flowchart of FIG. 9. In addition, this process is executed when the content attribute information list of the content attribute DB 14 is updated, for example, as the content of the content DB 16 is added or deleted.

In step S1, the catalog information creating unit 152 obtains the content attribute information list from the content attribute DB 14.

In step S2, the catalog information creating unit 152 creates the catalog information based on the content attribute information list. Specifically, first, the catalog information creating unit 152 counts the number of content items for each type of each category based on the content attribute information list and sets the count result as the recommendable content number of each type. In this case, the catalog information creating unit 152 collectively counts redundant content items into a single content. Therefore, the recommendable content number becomes a unique content number for each type.

The catalog information creating unit 152 sets the type of which the recommendable content number is equal to or greater than a predetermined recommendable type threshold value as the recommendable type which is the type of the content that can be recommended by the content server 15. That is, the type of the content of which the number is equal to or greater than the recommendable type threshold value is set to the recommendable type. In addition, the recommendable type threshold value is set to, for example, 100.

Furthermore, the catalog information creating unit 152 sets the type of which the recommendable content number is equal to or greater than a predetermined substitutable type threshold value as the substitutable type. That is, the type of the content of which the number is equal to or greater than the substitutable type threshold value is set to the substitutable type. The substitutable type threshold value is set to a value greater than the recommendable type threshold value, for example, 1000.

Here, the substitutable type is the type of the content that can be assigned instead in a case where there is no recommendable type corresponding with user preference in the category selected by the client 11 in the process described below. As a result, as described below, it is possible to recommend a majority type (the type having a larger number of songs) out of the selected category even when it is difficult to recommend the type corresponding with user preference.

The catalog information creating unit 152 creates catalog information representing the recommendable content number, whether or not the type is the recommendable type or whether or not the type is the substitutable type for each type of each category.

FIG. 10 illustrates exemplary catalog information. In FIG. 10, circle marks are given to the types set as the recommendable type or the substitutable type, and cross marks are given to the types which are not set as the as the recommendable type or the substitutable type. Although FIG. 10 illustrates only types of the large classification of each category, similar data may be registered in the catalog information in the types of the middle classification and the small classification.

The catalog information creating unit 152 stores the created catalog information in the content attribute DB 14.

Then, the process of creating catalog information is terminated.

Process of Obtaining Catalog Information

Figure 11:
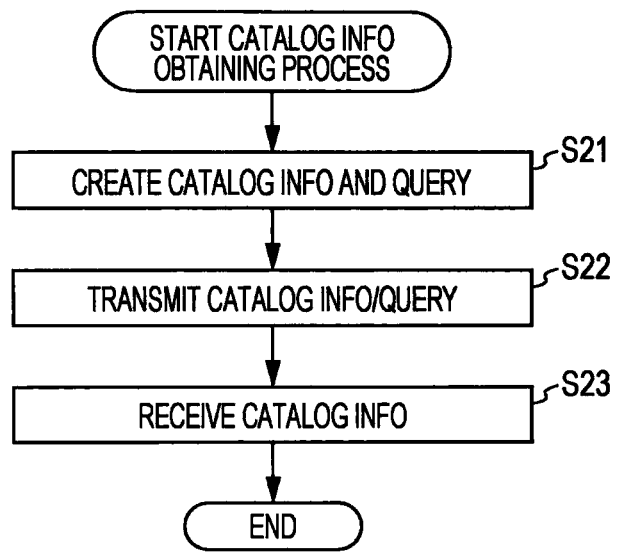
FIG. 11 is a flowchart illustrating a process of obtaining catalog information.

Next, a process of obtaining catalog information executed by the client 11 will be described with reference to the flowchart of FIG. 11. In addition, the process is executed, for example, when the client 11 is operated.

In step S21, the query generating unit 105 of the client 11 generates a catalog information/query and supplies the catalog information/query to the transmitter unit 106.

In step S22, the transmitter unit 106 transmits the catalog information/query to the content list creating server 13.

Figure 12:
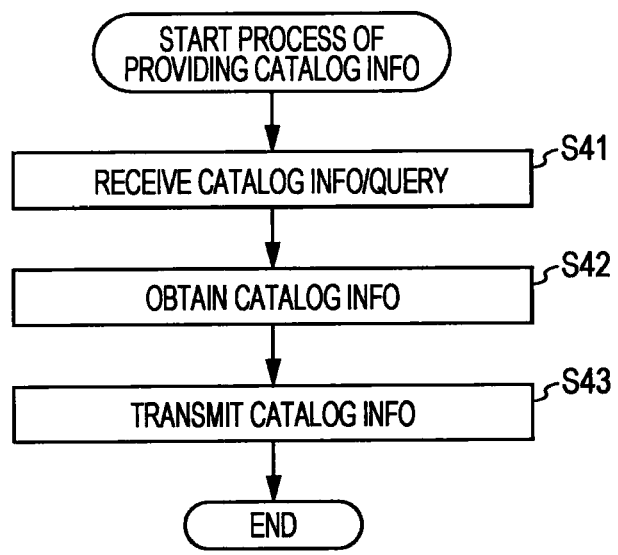
FIG. 12 is a flowchart illustrating a process of providing catalog information.

In step S41 of FIG. 12 described below, the content list creating server 13 receives the catalog information/query and transmits the catalog information in step S43.

In step S23, the receiver unit 103 receives catalog information transmitted from the content list creating server 13 and supplies the received catalog information to the category/type selection unit 104.

Then, the process of obtaining catalog information is terminated.

Process of Providing Catalog Information

Next, a process of providing catalog information executed by the content list creating server 13 corresponding to the process of obtaining catalog information of FIG. 11 will be described with reference to the flowchart of FIG. 12.

In step S41, the receiver unit 151 of the content list creating server 13 receives the catalog information/query transmitted from the client 11 and supplies the received catalog information/query to the catalog information creating unit 152.

In step S42, the catalog information creating unit 152 obtains the catalog information from the content attribute DB 14. Then, the catalog information creating unit 152 supplies the obtained catalog information to the transmitter unit 154.

In step S43, the transmitter unit 154 transmits the catalog information to the client 11.

Then, the process of providing catalog information is terminated.

Process of Obtaining/Reproducing Content

Figure 13:
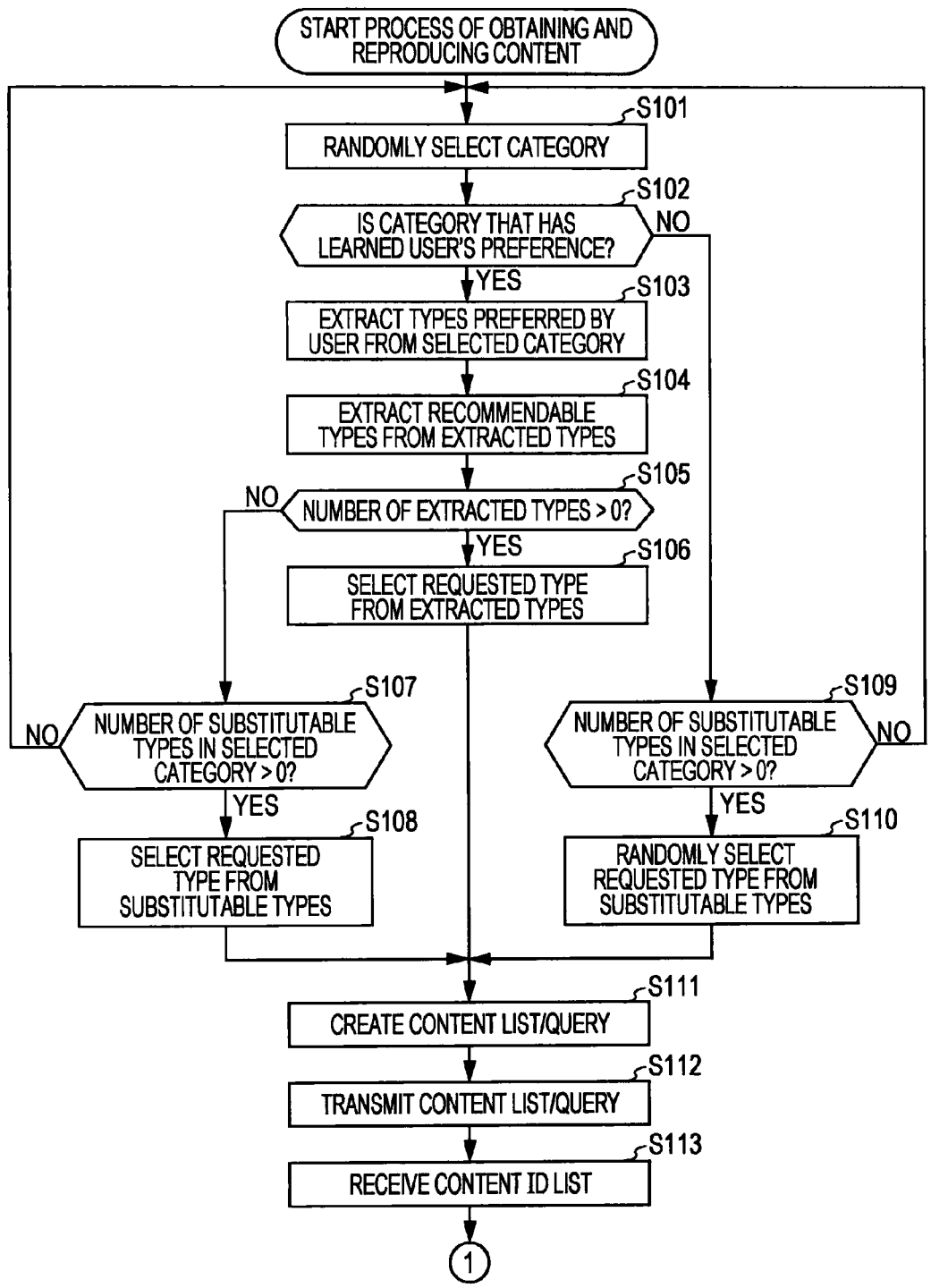
FIG. 13 is a flowchart illustrating a process of obtaining/reproducing content.
Figure 14:
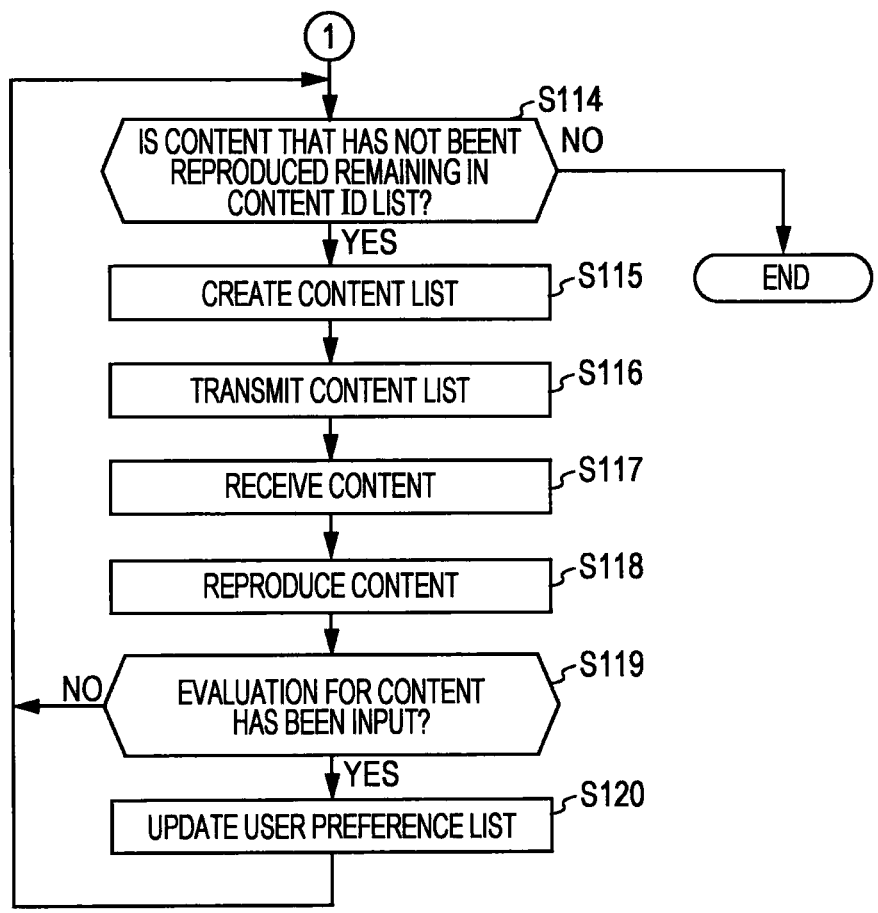
FIG. 14 is a flowchart illustrating a process of obtaining/reproducing content.

Next, a process of obtaining/reproducing content executed by the client 11 will be described with reference to FIGS. 13 and 14. This process is initiated, for example, when an instruction for reproducing content is input from a user through the input unit 101. In addition, the input unit 101 supplies the instruction from a user to the category/type selection unit 104, the reproduction unit 107, and the display control unit 109.

In step S101, the category/type selection unit 104 selects the category at random. For example, the category/type selection unit 104 selects at random one of 6 categories, including Time of Release (large classification), Time of Release (middle classification), Time of Release (small classification), Genre (large classification), Genre (middle classification), and Genre (small classification).

In step S102, the category/type selection unit 104 determines whether or not the category is a category subject to learning of user preference. Specifically, the category/type selection unit 104 obtains the user preference list from the user preference DB 12, and determines whether or not the selected category is a category subject to learning of user preference based on the user preference list. If it is determined that the selected category is the category subject to learning of user preference, the process advances to step S103.

In step S103, the category/type selection unit 104 extracts the types preferred by a user from the selected category based on the user preference list. For example, the category/type selection unit 104 extracts the type, of which the preference frequency of the user preference list is equal to or higher than a predetermined threshold value, from the types of the selected category as the type preferred by a user.

Figure 15:
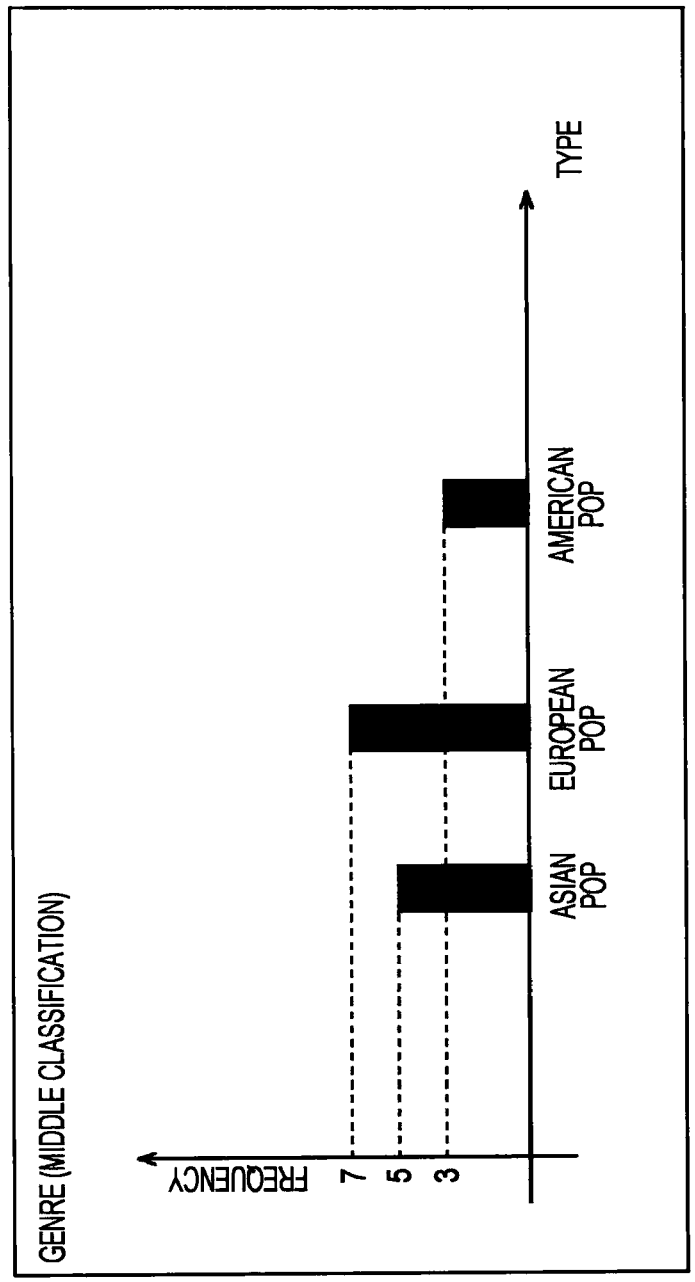
FIG. 15 is a diagram illustrating an exemplary distribution of preference frequency in the user preference list.
Figure 16:
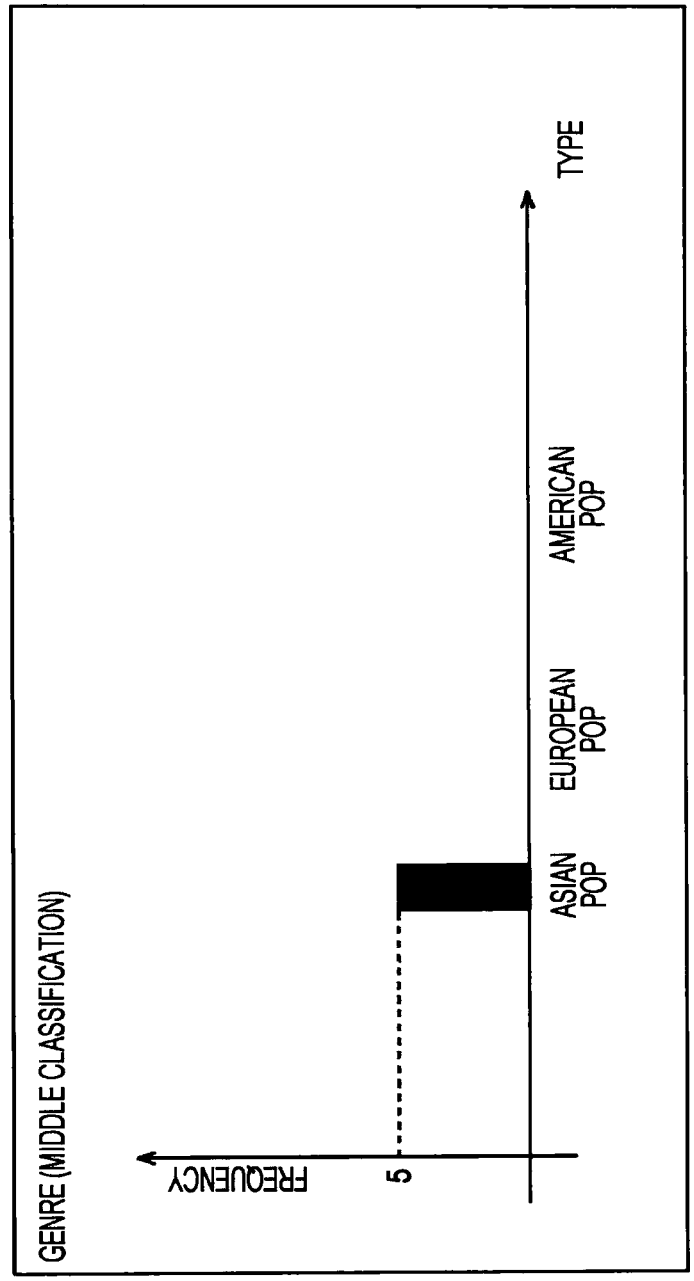
FIG. 16 is a diagram illustrating an exemplary distribution of preference frequency in the user preference list.

For example, a case where the selected category is the genre (middle classification) will be described with reference to FIGS. 15 and 16. FIGS. 15 and 16 illustrate an exemplary distribution of the preference frequency for each type of the genre (middle classification) in the user preference list. The abscissa denotes the type, and the ordinate denotes the preference frequency.

For example, in a case where the threshold value is set to 1, if the distribution of the preference frequency is determined as shown in FIG. 15, ASIAN-POP, EUROPEAN-POP, and AMERICAN-POP are extracted as the type preferred by a user. Meanwhile, if the distribution of the preference frequency is determined as shown in FIG. 16, only ASIAN-POP is extracted as the type preferred by a user.

In step S104, the category/type selection unit 104 extracts the recommendable type out of the extracted types based on the catalog information. As a result, it is possible to extract the recommendable type corresponding with user preference from the category selected at random.

For example, a case where the type is extracted using the catalog information shown in FIG. 17 will be considered. FIG. 17 illustrates a part of the portion corresponding to genre (middle classification) of the catalog information.

For example, in the processing of step S103, in a case where ASIAN-POP, EUROPEAN-POP, and AMERICAN-POP are extracted based on the distribution of the preference frequency of FIG. 15, EUROPEAN-POP and AMERICAN-POP are extracted as the recommendable type from them.

For example, in the processing of step S103, in a case where ASIAN-POP is extracted based on the distribution of the preference frequency of FIG. 16, ASIAN-POP is not the recommendable type. Therefore, not even one type is extracted.

In step S105, the category/type selection unit 104 determines whether or not the number of extracted types is greater than zero. If it is determined that the number of extracted types is greater than zero, that is, if one or more recommendable types corresponding with user preference are present in the selected category, the process advances to step S106.

In step S106, the category/type selection unit 104 selects the request type out of the extracted types.

For example, the category/type selection unit 104 selects the requested type out of the extracted types based on user preference. For example, in the example of FIGS. 15 and 17 described above, a case where EUROPEAN-POP and AMERICAN-POP are extracted will be considered.

First, the category/type selection unit 104 normalizes the preference frequencies of EUROPEAN-POP and AMERICAN-POP and generates a discrete probability density of the following equation (1).

$$\text{Probability}_k = \text{Frequency}_k / \Sigma(\text{Frequency}_k)$$
$$\{k=\text{EUROPEAN-POP, AMERICAN-POP}\} \quad (1)$$

where, $\text{Frequency}_k$ denotes the preference frequency.

The category/type selection unit 104 generates a random number between 0 and 1, and selects any one of EUROPEAN-POP and AMERICAN-POP depending on the generated number and the probability density function of the equation (1). Therefore, EUROPEAN-POP is selected in a probability of 70%, and AMERICAN-POP is selected in a probability of 30%.

The requested type is selected in a similar way when three or more types are selected. As a result, the type having high user preference is selected first out of the recommendable types in the selected category.

For example, the requested type may be selected at random out of the extracted types without considering user preference.

The category/type selection unit 104 notifies the query generating unit 105 of the selected category and type. Then, the process advances to step S111.

Meanwhile, in step S105, if it is determined that the number of extracted types is zero, that is, if there is not recommendable type corresponding with user preference in the selected category, the process advances to step S107.

In step S107, the category/type selection unit 104 determines whether or not the number of substitutable types in the selected category is greater than zero based on the catalog information. If it is determined that the number of substitutable types in the selected category is zero, that is, if there is no substitutable type in the selected category, the process returns to step S101. Then, the processing subsequent to step S101 is executed again starting from selection of the category.

Meanwhile, in step S107, if it is determined that the number of substitutable types in the selected category is greater than zero, that is, if there is a substitutable type in the selected category, the process advances to step S108.

In step S108, the category/type selection unit 104 selects the requested type out of the substitutable types.

For example, the category/type selection unit 104 selects the requested type at random out of the substitutable types in the selected category. In the example of FIGS. 16 and 17 described above, the requested type is selected at random from INDIAN-POP and AMERICAN-POP which are set as the substitutable types in the selected genre (middle classification).

For example, a distance between the substitutable type and the type which is preferred by a user but is not the recommendable type in the selected category is defined, and the requested type may be selected based on this distance. In the example of FIGS. 16 and 17, the requested type is selected based on the distance between ASIAN-POP which is the type preferred by a user but is not the recommendable type, and INDIAN-POP and AMERICAN-POP which are the substitutable types.

For example, the category/type selection unit 104 defines a geographical distance between the East Asia region which is a source of ASIAN-POP and India which is a source of INDIAN-POP as the distance between ASIAN-POP and INDIAN-POP. In addition, the category/type selection unit 104 defines a geographical distance between the East Asia region which is a source of ASIAN-POP and the North America region which is a source of AMERICAN-POP as the distance between ASIAN-POP and AMERICAN-POP.

Alternatively, the category/type selection unit 104 defines the distance between ASIAN-POP and INDIAN-POP based on similarity of musical characteristic amounts between ASIAN-POP and INDIAN-POP. In addition, the category/type selection unit 104 defines the distance between ASIAN-POP and AMERICAN-POP based on similarity of musical characteristic amounts between ASIAN-POP and AMERICAN-POP.

The category/type selection unit 104 selects the type having a nearer distance from ASIAN-POP out of INDIAN-POP and AMERICAN-POP as the requested type. As a result, it is possible to select in priority the type nearer to the type preferred by a user as the requested type out of the substitutable types.

For example, the type that has been most frequently reproduced in the past may be selected as the requested type out of the substitutable type based on a reproduction history of the content in the past.

For example, in a case where the type belonging to a layer upper than that of the type which is preferred by user but is not the recommendable type is the recommendable type in the selected category, the type of the upper layer may be selected as the requested type. For example, in the example of FIGS. 16 and 17, in a case where POP which is the type belonging to a layer upper than that of ASIAN-POP is the recommendable type, POP is selected as the requested type.

The category/type selection unit 104 notifies the query generating unit 105 of the selected category and type. Then, the process advances to step S111.

Since the type having a larger number of content items is selected as the substitutable type out of the recommendable types, it is possible to recommend a content having a greater variety by selecting the requested type from the substitutable type.

Meanwhile, in step S102, if it is determined that the selected category is not the category subject to learning of user preference, the process advances to step S109.

In step S109, similar to step S107, it is determined whether or not the number of substitutable types in the selected category is greater than zero. If it is determined that the number of the substitutable types in the selected category is zero, the process returns to step S101. Then, the processing subsequent to step S101 is executed again starting from selection of the category.

Meanwhile, if it is determined that the number of substitutable types in the selected category is greater than zero in step S109, the process advances to step S110.

In step S110, the category/type selection unit 104 selects the requested type out of substitutable types in the selected category at random. The category/type selection unit 104 notifies the query generating unit 105 of the selected category and type. Then, the process advances to step S111.

In step S111, the query generating unit 105 generates a content list query by using the category and the type selected by the category/type selection unit 104 as an extraction condition. The query generating unit 105 supplies the generated content list query to the transmitter unit 106.

In step S112, the transmitter unit 106 transmits the content list/query generated by the query generating unit 105 to the content list creating server 13.

Figure 22:
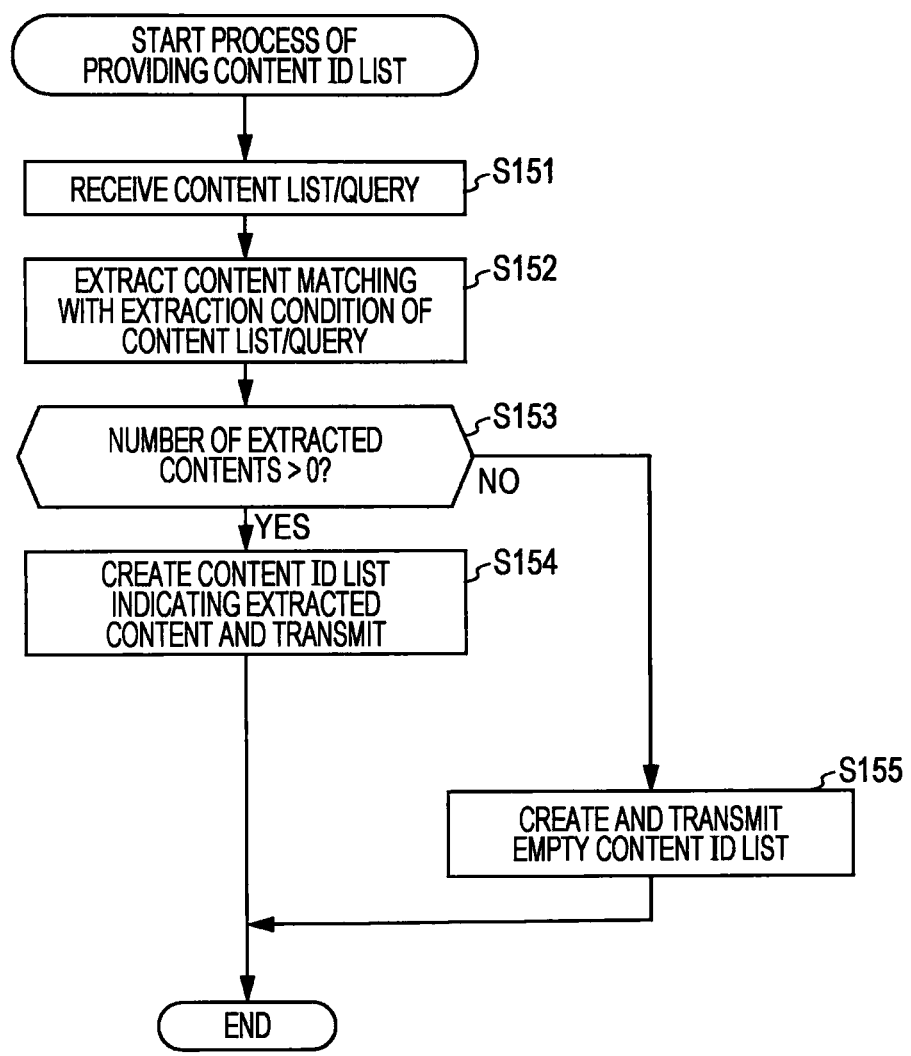
FIG. 22 is a flowchart illustrating a process of providing the content ID list.

The content list creating server 13 receives the content list/query from the client 11 in step S151 of FIG. 22 which will be described below. The content list creating server 13 transmits the content ID list corresponding to the content list/query in step S154 or S155. In addition, this content ID list contains the categories designated by the content list/query and the content IDs of the content items of the type, and the like.

In step S113, the receiver unit 103 of the client 11 receives the content ID list transmitted from the content list creating server 13. The receiver unit 103 supplies the received content ID list to the reproduction unit 107.

In step S114, the reproduction unit 107 determines whether or not there remains a content that has not been reproduced in the content ID list. If it is determined there remains a content that has not been reproduced in the content ID list, the process advances to step S115.

In step S115, the query generating unit 105 generates the content/query. Specifically, the reproduction unit 107 selects one of the content that has not been reproduced in the content ID list and notifies the query generating unit 105 of the content ID of the selected content. The query generating unit 105 generates the content query by using that content ID as an extraction condition and supplies the content query to the transmitter unit 106.

In step S116, the transmitter unit 106 transmits the content query generated by the query generating unit 105 to the content server 15.

As the content server 15 receives the content query, the content server 15 extracts the content corresponding with the content ID indicated by the content query from the content DB 16. In addition, the content server 15 transmits the extracted content to the client 11.

In step S117, the receiver unit 103 of the client 11 receives the transmitted content from the content server 15. The receiver unit 103 supplies the received content to the reproduction unit 107, and supplies the meta information included in the received content to the display control unit 109.

In step S118, the reproduction unit 107 reproduces the content obtained from the content server 15. The reproduction unit 107 supplies the sound data obtained as a result to the output unit 108. For example, the output unit 108 may output sound based on the sound data or may output sound data to another device connected to the output unit 108.

In addition, the reproduction unit 107 appropriately notifies the reproduction condition of the content to the display control unit 109. The display control unit 109 displays information such as a title of the content being reproduced or a reproduction status on the display unit 110. In addition, the display control unit 109 displays a screen for inputting user evaluation regarding the content being reproduced on the display unit 110.

In step S119, the user preference learning unit 102 determines whether or not evaluation for the content has been input. The user preference learning unit 102 determines that evaluation for the content has been input in a case where a user inputs evaluation for the content being reproduced using the input unit 101 during reproduction of the content, and the evaluation result is supplied to the input unit 101. Then, the process advances to step S120.

Figure 18:
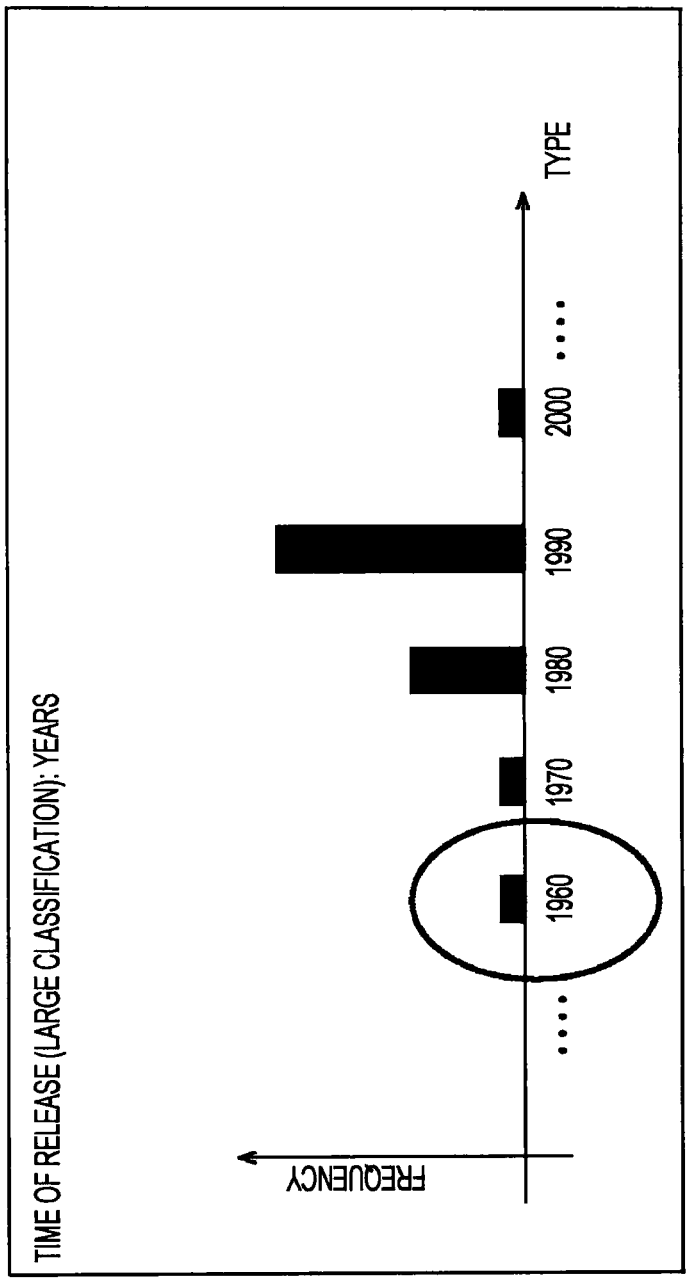
FIG. 18 is a diagram illustrating a method of updating a user preference list.
Figure 19:
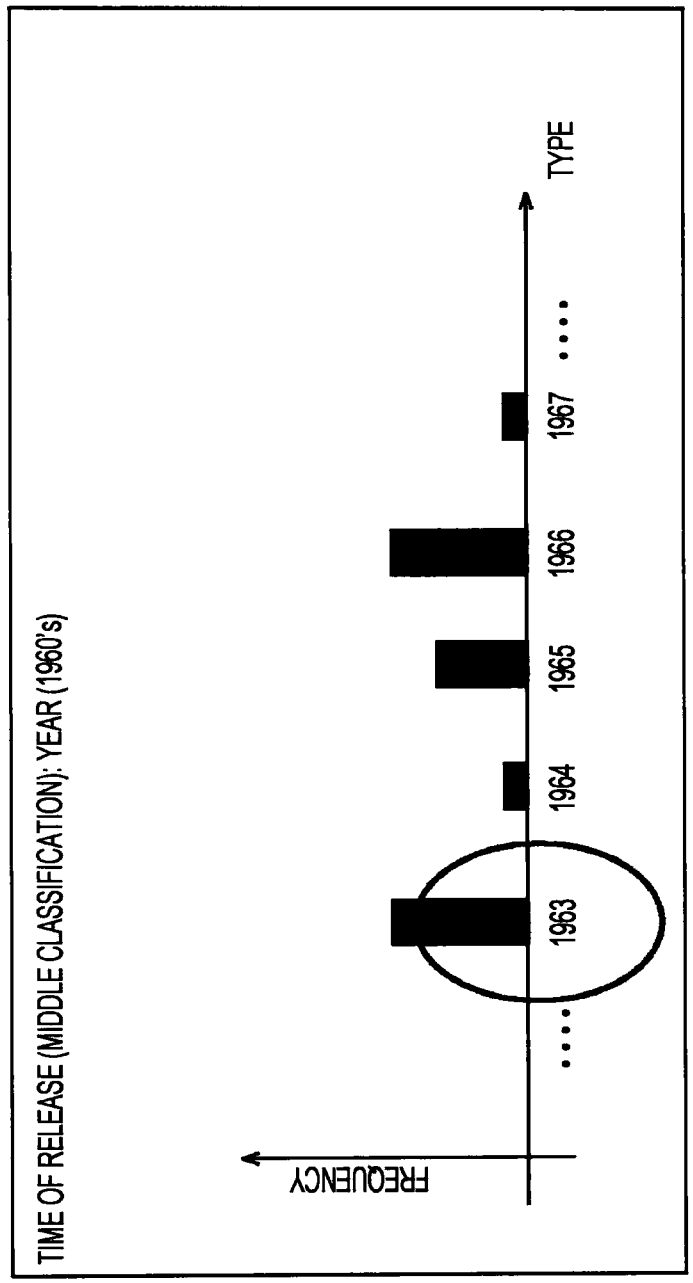
FIG. 19 is a diagram illustrating a method of updating a user preference list.
Figure 20:
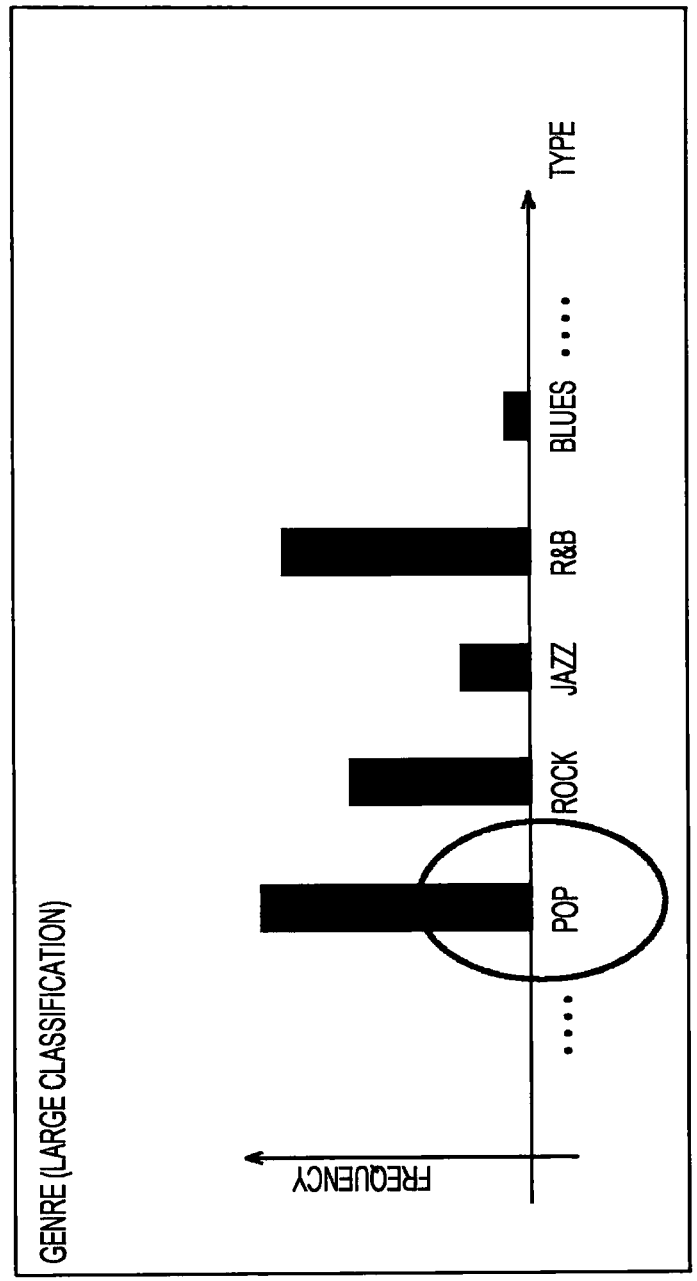
FIG. 20 is a diagram illustrating a method of updating a user preference list.
Figure 21:
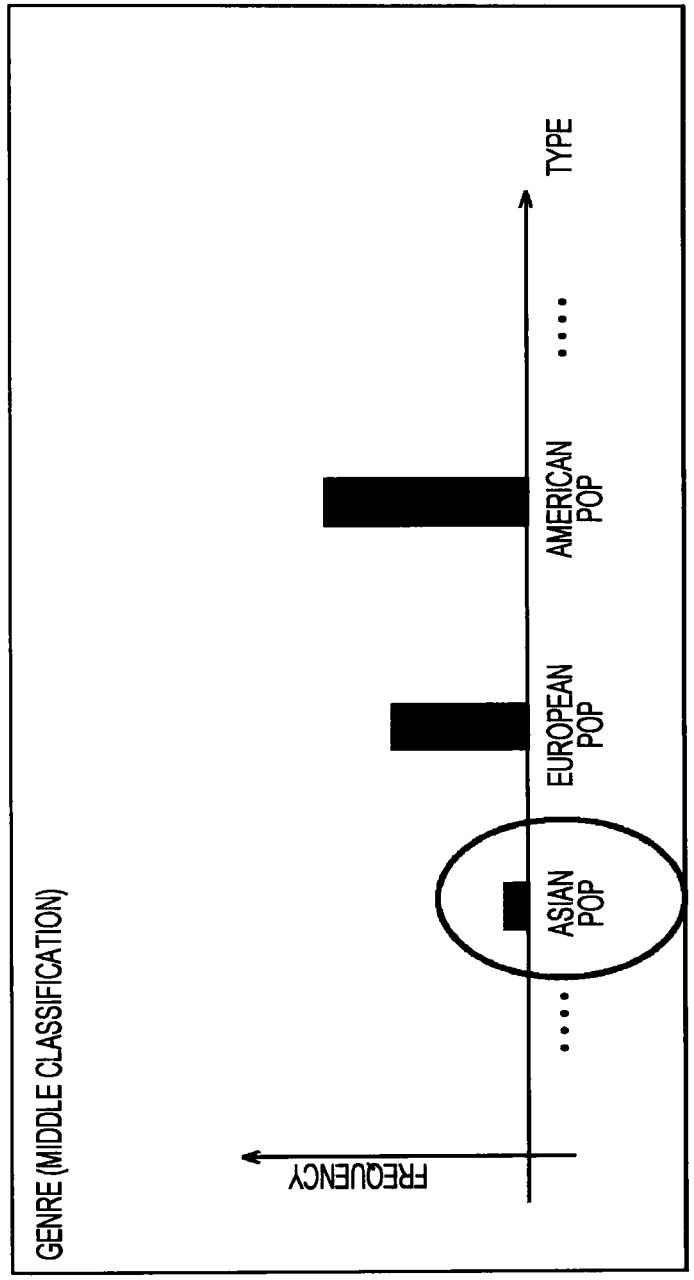
FIG. 21 is a diagram illustrating a method of updating a user preference list.

In step S120, the user preference learning unit 102 updates the user preference list of the user preference DB 12. For example, consider a case where a user evaluates the content A as "favorite" during reproduction of the content A in FIG. 5 described above. In this case, since the type of the time of release (large classification) of the content A is 1960's, the preference frequency of 1960's circled in the distribution of the preference frequency of the time of release (large classification) of FIG. 18 is incremented by one. In this manner, the preference frequency of 1963 circled in the distribution of the preference frequency of the time of release (middle classification) of FIG. 19 is incremented by one. Similarly, in this manner, each of the preference frequency of POP circled in the distribution of the preference frequency of the genre (large classification) of FIG. 20 and the preference frequency of ASIAN-POP circled in the distribution of the preference frequency of the genre (middle classification) of FIG. 21 is incremented by one.

Otherwise, if a user evaluates the content A as "unfavorite," the preference frequency of each type circled in FIGS. 18 to 21 is decremented by one.

In this manner, the user preference learning unit 102 updates the data of the bar chart indicating user preference for each type included in the user preference list.

Then, the process returns to step S114.

Meanwhile, if it is determined that evaluation for the content has not been input in step S119, the process of step S120 is not performed, and the process returns to step S114.

Then, in step S114, the process of steps S114 to S120 is repeatedly executed until it is determined that there remains no unreproduced content in the content ID list. As a result, the content items are sequentially supplied from the content server 15 to the client 11 according to the content ID list, and the client 11 reproduces the content. In addition, the user preference list is updated based on the user's evaluation for the reproduced content.

Meanwhile, in step S114, it is determined that there remains no unreproduced content in the content ID list, the process of obtaining/reproducing the content is terminated.

Process of Providing Content ID List

Next, a process of providing the content ID list executed by the content list creating server 13 corresponding to the process of obtaining/reproducing content by the client 11 of FIGS. 13 and 14 will be described with reference to the flowchart of FIG. 22.

In step S151, the receiver unit 151 of the content list creating server 13 receives the content list•query transmitted from the client 11. The receiver unit 151 supplies the received content list query to the content ID list creating unit 153.

In step S152, the content ID list creating unit 153 extracts the content corresponding with the extraction condition of the content list•query. That is, the content ID list creating unit 153 extracts the information on the content corresponding with the type and the category requested by the client 11 from the content attribute information list of the content attribute DB 14.

In step S153, the content ID list creating unit 153 determines whether or not the number of the extracted content items is greater than zero. If it is determined that the number of the extracted content items is greater than zero, the process advances to step S154.

In step S154, the content list creating server 13 creates the content ID list indicating the extracted content items and transmits it. Specifically, the content ID list creating unit 153 creates the content ID list containing information on the content items extracted from the content attribute information list and supplies the content ID list to the transmitter unit 154. The transmitter unit 154 transmits the obtained content ID list to the client 11. Then, the process of providing the content ID list is terminated.

Otherwise, if it is determined that the number of the extracted content items is zero in step S153, the process advances to step S155. As described above, since the client 11 selects the requested type from the recommendable types or the substitutable types, it is considered that the number of the extracted content items does not become zero. For example, when old catalog information is used in the client 11, it is anticipated that the number of the extracted content items becomes zero.

In step S155, the content list creating server 13 creates an empty content ID list and transmits the empty content ID list. Specifically, the content ID list creating unit 153 creates the empty content ID list and supplies it to the transmitter unit 154. The transmitter unit 154 transmits the obtained content ID list to the client 11. Then, the process of providing the content ID list is terminated.

In this manner, the content server 15 performs a request for the recommendable type from the client 11 and does not request an unrecommendable type. As a result, the client 11 can reliably receive recommendation of the content items in response to the request, in which the number of content items is equal to or greater than a predetermined number. In addition, it is possible to prevent unnecessary communication between the client 11 and the content server 15 or unnecessary processing in the content server 15. Therefore, it is possible to effectively utilize a source of the content server 15 and increase the number of clients that can be processed. Furthermore, by omitting unnecessary communication, it is possible to realize a system having a fast response time.

Since the content of the type corresponding with user preference is recommended in a highest priority from the category subject to learning of user preference, it is possible to increase user satisfaction. Furthermore, since the content is recommended from the category not subject to learning of user preference, it is possible to widen user preference.

In addition, since the catalog information and the content ID list are delivered from the content list creating server 13 to the client 11, the client 11 is allowed to perform a request in appropriate time depending on addition/deletion of the content.

2. Modifications

Hereinafter, modifications of the disclosure will be described.

Modification 1

The disclosure may be applied to even a case where various content items other than music data are recommended based on the type and the category of the content. For example, the disclosure may be applied to recommendation of video content items such as films, TV programs, video clips, or other content items such as photographs, games, and electronic books.

Modification 2

Although the content list creating server 13 and content server 15 are separately provided in the aforementioned description, they may be implemented in the same server. In addition, by separately using two servers, it is possible to reduce a burden of the server for delivering the content and deliver the content faster.

Modification 3

Although the client 11 exemplarily selects a single category and type in the aforementioned description, two or more categories and types may be selected. For example, if a plurality of types are selected, the content list creating server 13 may extract the content corresponding to any one of a plurality of the selected types or extract the content items corresponding to all types. In the latter case, it is considered that, even when a plurality of types are used, the recommendable type and the substitutable type are determined, and the result thereof is registered in the content attribute information list.

Modification 4

Although, when there is no recommendable type corresponding with user preference in the selected category, the requested type is selected out of the substitutable types of that category in the aforementioned description, the selection may be made without limiting to the substitutable type.

For example, out of types approximate to the type corresponding with user preference and the type corresponding with user preference in the selected category, one or more types may be selected such that a sum of the recommendable content number is equal to or greater than a predetermined threshold value. In this case, since any kind of type can be selected without limitation, the recommendable type and the substitutable type may also be selected. In addition, as a threshold value in this case, for example, the recommendable type threshold value used to set the aforementioned recommendable type or the substitutable type threshold value used to set to the substitutable type may be used.

The selected type may be limited to the type corresponding with user preference except for the type approximate to the type corresponding with user preference. That is, in the selected category, a plurality of types may be selected such that the sum of the recommendable content number becomes equal to or greater than a predetermined threshold value out of the types corresponding with user preference. In addition, as the threshold value in this case, for example, the recommendable type threshold value or the substitutable type threshold value may be used.

Furthermore, the selected type may be limited to the recommendable type. That is, in the selected category, one or more types may be selected out of the recommendable types approximate to the type corresponding with user preference such that the sum of the recommendable content number is equal to or greater than a predetermined threshold value. In addition, in this case, since the substitutable type is also included in the recommendable type, the substitutable type may be selected. In addition, as a threshold value of this case, for example, the substitutable type threshold value may be used.

In addition, as a method of selecting the type approximate to the type corresponding with user preference, for example, distances between the aforementioned types may be defined, and the type may be selected in the order of the distances from the type corresponding with user preference. Alternatively, for example, the number of the selected types can be adjusted by considering the recommendable content number of each type as well as the distance between types.

As described above, compared to a case where the type is limited to the substitutable type, it is possible to reliably recommend a predetermined number or more of the content items more suitable for user preference.

In any case described above, if there is no type corresponding with user preference in the selected category, and it is difficult to select the type based on user preference, the type may be selected, for example, out of the substitutable types.

Modification 5

Furthermore, although the category/type selection unit 104 of the client 11 selects the category at random in the aforementioned exemplary description, the category may be selected, for example, according to a predetermined algorithm or rule. For example, the user may select the category.

Modification 6

The client 11 may transmit a query satisfying the extraction condition regarding the selected category and type to the content server 15 and directly obtain the content corresponding with the extraction condition from the content server 15 without obtaining the content ID list. Similarly, in this case, since the requested type is selected out of the recommendable types, the client 11 can reliably receive recommendation of the content from the content server 15 while occurrence of unnecessary communication or processing is prevented.

Modification 7

Furthermore, it is possible to delete the recommendable content number from the catalog information. In addition, the recommendable type and the substitutable type may be deleted from the catalog information, and the client 11 may determine the recommendable type and the substitutable type based on the recommendable content number.

Modification 8

Although the recommendable type and the substitutable type are set based on the number of content items in the aforementioned exemplary description, conditions other than or different from the number of content items may be combined and set.

For example, the type including a greater number of new content items (for example, content having new time of release) may be set to the recommendable type or the substitutable type as a priority. As a result, it is possible to recommend the newly added content in a positive manner.

In addition, the recommendable type or the substitutable type may be set, for example, depending on seasons (such as Christmas or Halloween). As a result, it is possible to recommend the content suitable for a season in an active manner.

Modification 9

Furthermore, the categories and the types of the content described above are exemplary, and they may be set in an arbitrary manner. In addition, the number of categories and the number of types may be set to an arbitrary value. Furthermore, the categories do not necessarily have a hierarchical structure.

Modification 10

The user preference DB 12, the content attribute DB 14, and the content DB 16 may be included in the client 11, the content list creating server 13, and the content server 15, respectively. Alternatively, they may be provided separately.

Modification 11

Although each client 11 learns user preference in the aforementioned exemplary description, the content list creating server 13 may learn user preference of each client 11. Specifically, in a case where, for example, a user inputs evaluation on the content, such as "favorite" or "unfavorite," to the client 11, the client 11 transmits information representing the input evaluation to the content list creating server 13. The content list creating server 13 creates the aforementioned user preference list for each user based on the obtained information and provides the user preference list to each client 11. As a result, it is possible to remove the necessity for adding the type and the category of the content to the content ID list transmitted from the content list creating server 13 to each client 11.

Furthermore, the content list creating server 13 may also select the type and the category of the recommended content using the user preference list of each user in response to the request from each client 11. In this case, it is not necessary to provide the user preference list from the content list creating server 13 to each client 11.

In addition, the user evaluation information may be transmitted from the client 11 to the content list creating server 13 as it is received or after a predetermined amount of information is accumulated and arranged.

Modification 12

In addition to "favorite" or "unfavorite" as the evaluation input for the content from a user, for example, the evaluation input may be made numerically (explicit feedback) or based on the manipulation history (implicit feedback) such as playback, stop, volume up/down, repeated playback, and skip. Furthermore, the user preference list may be created based on the evaluation input.

Exemplary Computer Configuration

A series of processes in the client 11, the content list creating server 13, and the content server 15 described above may be implemented in hardware or software. If a series of processes are implemented in software, a program included in the software is installed in a computer. It is noted that the computer includes, for example, a computer integrated into dedicated hardware, a general-purpose personal computer capable of executing various functions by installing various programs, and the like.

FIG. 23 is a block diagram illustrating an exemplary configuration of hardware of the computer that executes a series of processes described above using a program.

In the computer, a central processing unit (CPU) 301, a read-only memory (ROM) 302, and a random access memory (RAM) 303 are connected to each other through a bus 304.

Furthermore, an input/output interface 305 is connected to the bus 304. The input/output interface 305 is connected to the input unit 306, the output unit 307, the storage unit 308, the communication unit 309, and the drive 310.

The input unit 306 includes a keyboard, a mouse, a microphone, and the like. The output unit 307 includes a display, a loudspeaker, and the like. The storage unit 308 includes a hard disk, a nonvolatile memory, and the like. The communication unit 309 includes a network interface and the like. The drive 310 drives a removable media 311 such as a magnetic disk, an optical disc, an optical-magnetic disc, or a semiconductor memory.

In the computer configured in this manner, the CPU 301 executes a series of processes described above, for example, by loading the program stored in the storage unit 308 on the RAM 303 through the input/output interface 305 and the bus 304 and executing the same.

The program executed by the computer (CPU 301) may be recorded in the remote media 311 and provided, for example, as a package media and the like. In addition, the program may be provided through a local area network (LAN), the Internet, wired/wireless transmission media such as so-called digital satellite broadcasting.

In the computer, the program may be installed in the storage unit 308 through the input/output interface 305 by installing the remote media 311 in the drive 310. In addition, the program may be received by the communication unit 309 through a wired/wireless transmission medium and installed in the storage unit 308. Alternatively, the program may be installed in the ROM 302 or the storage unit 308 in advance.

The program executed by the computer may be a program that sequentially performs processing in the order described herein or may be a program that performs processing in parallel or at a necessary timing such as when it is called.

Herein, the term, system, refers to a collective apparatus including a plurality of devices, means, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   at least one processor;
   a learning unit that using the at least one processor learns user preference information to search for content items on a server, wherein the user preference information comprises at least one user preference category and user preference attribute information that is associated with the at least one user preference category;
   a selection unit that using the at least one processor selects at least one recommendable type content item or at least one substitutable content item from the content items on the server,
      wherein the selection unit selects the at least one recommendable type content item from the content items on the server that match the user preference information, and
      wherein if none of the content items on the server are recommendable type content items, then the selection unit selects the at least one substitutable type content item from the content items on the server using different user preference attribute information than the user preference information and the same at least one user preference category as the user preference information; and
   an obtaining unit that using the at least one processor obtains content selected from at least one recommendable type content item or at least one substitutable type content item from the server.

2. The information processing apparatus according to claim 1, wherein,
   if the selection unit selects at least one user preference category that does not learn user preferences, the selection unit selects one or more substitutable type content items when there is the substitutable type in the same at least one user preference category as the user preference information, and
   the selection unit selects other categories different from the at least one user preference category if when there are no substitutable type content items in the at least one user preference category.

3. The information processing apparatus according to claim 1, wherein the selection unit selects at least one recommendable type content item having a high user preference with priority over other recommendable type content items.

4. The information processing apparatus according to claim 3, wherein the selection unit selects with priority the at least one substitutable type content item that approximately matches the user preference attribute information within the at least one user preference category.

5. The information processing apparatus according to claim 1, wherein the obtaining unit obtains the user preference information from the server or another server different from the server.

6. The information processing apparatus according to claim 1, wherein the obtaining unit obtains a list of the selected at least one recommendable type content item or at least one substitutable type content item from the server or another server different from the server, and obtains content selected from at least one recommendable type content item or at least one substitutable type content item from the server based on the list.

7. The information processing apparatus according to claim 1, wherein:
the at least one recommendable type content item is a type of content items in the server,
the number of the at least one recommendable type content item being equal to or greater than a first threshold value,
the at least one substitutable type content item is on the server,
the number of the at least one substitutable type content item on the server being equal to or greater than a second threshold value, and
the second threshold value is higher than the first threshold value.

8. The information processing apparatus according to claim 1, wherein the content items are audio files.

9. The information processing apparatus according to claim 8, wherein the audio files are musical audio files.

10. The information processing apparatus according to claim 9, wherein the at least one user preference category comprises at least one of time of release and genre of music of the musical audio files.

11. The information processing apparatus according to claim 10, wherein:
the user preference information for a time of release user preference category is the year of the release of the music of the music audio file for the content items stored on the server; and
the user preference information of a genre user preference category is an identification of the type of the music of the music audio file for the content items stored on the server.

12. An information processing method of an information processing apparatus, the method comprising:
learning user preference information to search for content items on a server to be selected, wherein the user preference information comprises at least one user preference category and user preference attribute information that is associated with the at least one user preference category;
selecting at least one recommendable type content item or at least one substitutable content item from the content items on the server,
wherein the selecting selects the at least one recommendable type content item from the content items on the server that match the user preference information, and
wherein if none of the content items on the server are recommendable type content items, then the selecting selects the at least one substitutable type content item from the content items on the server using different user preference attribute information than the user preference information and the same at least one user preference category as the user preference information; and
obtaining content selected from at least one recommendable type content item or at least one substitutable type content item from the server.

13. A non-transitory computer-readable medium having embodied thereon a program, which when executed by a processor of a computer causes the processor to perform a method, the method comprising:
learning user preference information to search for content items on a server to be selected, wherein the user preference information comprises at least one user preference category and user preference attribute information that is associated with the at least one user preference category;
selecting at least one recommendable type content item or at least one substitutable content item from the content items on the server,
wherein the selecting selects the at least one recommendable type content item from the content items on the server that match the user preference information, and
wherein if none of the content items on the server are recommendable type content items, then the selecting selects the at least one substitutable type content item from the content items on the server using different user preference attribute information than the user preference information and the same at least one user preference category as the user preference information; and
obtaining content selected from at least one recommendable type content item or at least one substitutable type content item from the server.

14. An information processing system comprising a client, a first server, and a second server,
wherein the client has
a learning unit that learns user preference information to search for content items on a server to be selected, wherein the user preference information comprises at least one user preference category and user preference attribute information that is associated with the at least one user preference category,
a selection unit that selects at least one recommendable type content item or at least one substitutable content item from the content items on the server,
wherein the selection unit selects the at least one recommendable type content item from the content items on the server that match the user preference information, and
wherein if none of the content items on the server are recommendable type content items, then the selection unit selects the at least one substitutable type content item from the content items on the server using different user preference attribute information than the user preference information and the same at least one user preference category as the user preference information, and
an obtaining unit that obtains content selected from at least one recommendable type content item or at least one substitutable type content item from the server,
wherein the first server includes a first transmission unit for transmitting the selected at least one recommendable type content item or at least one substitutable type content item to the client, and
wherein the second server includes an information creating unit for creating the user preference information, and a second transmission unit for transmitting the user preference information to the client.

15. The information processing system according to claim 14, wherein
- the second server further includes a list creating unit for creating a list of selected at least one recommendable type content item or at least one substitutable type content item,
- the second transmission unit of the second server further transmits the list to the client, and
- the obtaining unit of the client further obtains the list from the second server, and obtains content selected from at least one recommendable type content item or at least one substitutable type content item from the first sever based on the list.

16. An information processing method comprising:
- in a client,
  - learning user preference information to search for content items on a first server to be selected;
- in a second server,
  - creating at least one user preference category and user preference attribute information that is associated with the at least one user preference category substitutable type, and
  - transmitting the at least one user preference category and the user preference attribute information to the client; and
- in the client,
  - selecting at least one recommendable type content item or at least one substitutable content item from the content items on the first server,
    - wherein the selecting selects the at least one recommendable type content item from the content items on the first server that match the user preference information, and
    - wherein if none of the content items on the first server are recommendable type content items, then the selecting selects the at least one substitutable type content item from the content items on the first server using different user preference attribute information than the user preference information and the same at least one user preference category as the user preference information, and
  - obtaining content selected from at least one recommendable type content item or at least one substitutable type content item from the first server.

* * * * *